(12) United States Patent
Hashimoto

(10) Patent No.: US 9,934,084 B2
(45) Date of Patent: Apr. 3, 2018

(54) DUMP MANAGEMENT APPARATUS, DUMP MANAGEMENT PROGRAM, AND DUMP MANAGEMENT METHOD

(71) Applicant: FUJITSU LIMITED, Kawasaki-shi, Kanagawa (JP)

(72) Inventor: Yuji Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 89 days.

(21) Appl. No.: 15/140,574

(22) Filed: Apr. 28, 2016

(65) Prior Publication Data
US 2016/0357624 A1   Dec. 8, 2016

(30) Foreign Application Priority Data

Jun. 3, 2015   (JP)  ................................ 2015-112786

(51) Int. Cl.
 *G06F 11/00*   (2006.01)
 *G06F 11/07*   (2006.01)
 *G06F 9/46*   (2006.01)
 *G06F 9/50*   (2006.01)

(52) U.S. Cl.
 CPC ............ *G06F 11/0778* (2013.01); *G06F 9/46* (2013.01); *G06F 9/5027* (2013.01); *G06F 11/0724* (2013.01); *G06F 11/0727* (2013.01); *G06F 11/0748* (2013.01); *G06F 11/0757* (2013.01)

(58) Field of Classification Search
 CPC ............ G06F 11/0778; G06F 11/0748; G06F 11/0727
See application file for complete search history.

(56) References Cited

U.S. PATENT DOCUMENTS

| 7,783,932 B1* | 8/2010 | Eigen | G06F 11/0727 |
| | | | 714/38.11 |
| 7,913,115 B1* | 3/2011 | Powers | G06F 11/0748 |
| | | | 714/18 |
| 2008/0005609 A1* | 1/2008 | Zimmer | G06F 11/0748 |
| | | | 714/5.11 |

(Continued)

FOREIGN PATENT DOCUMENTS

| JP | 2000-278308 | 10/2000 |
| JP | 2008-225599 | 9/2008 |
| JP | 2010-176345 | 8/2010 |

*Primary Examiner* — Charles Ehne
(74) *Attorney, Agent, or Firm* — Fujitsu Patent Center

(57) ABSTRACT

A dump management apparatus having a memory; and a processor that executes a process including: selecting, in response to receiving a notification of an occurrence of a failure from a failure node of a parallel computer having a plurality of nodes, a plurality of nodes that are not scheduled to execute a job within at least a first time needed to perform dump processing of a memory of the failure node and have a memory capacity needed to perform the dump processing as dump-processing target nodes from among a plurality of nodes within a reference range near the failure node; selecting the dump-processing target nodes with a first priority according to which a plurality of adjacent nodes are preferentially selected as a candidate over a plurality of dispersing nodes from among candidates for the dump-processing target nodes; and causing the failure node to transfer a dump file inside the memory of the failure node to memories of the dump-processing target nodes.

12 Claims, 20 Drawing Sheets

(56) References Cited

U.S. PATENT DOCUMENTS

| | | | | |
|---|---|---|---|---|
| 2008/0126879 A1* | 5/2008 | Tiwari | ............... | G06F 11/0712 |
| | | | | 714/46 |
| 2010/0333066 A1* | 12/2010 | Feniello | ............. | G06F 11/0778 |
| | | | | 717/120 |
| 2015/0261597 A1* | 9/2015 | Darisa | ................ | G06F 11/0778 |
| | | | | 714/48 |
| 2016/0062811 A1* | 3/2016 | Yamada | ............. | G06F 11/0709 |
| | | | | 714/799 |

* cited by examiner

FIG. 10
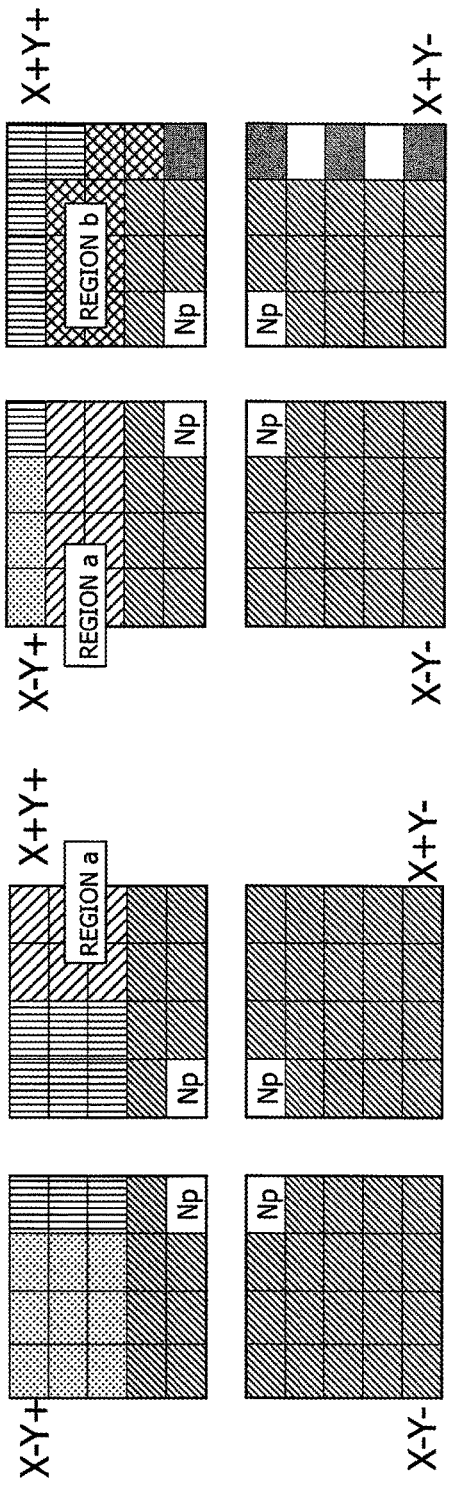
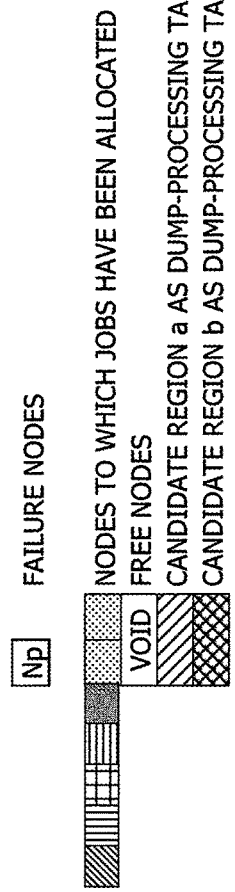

FIG. 11
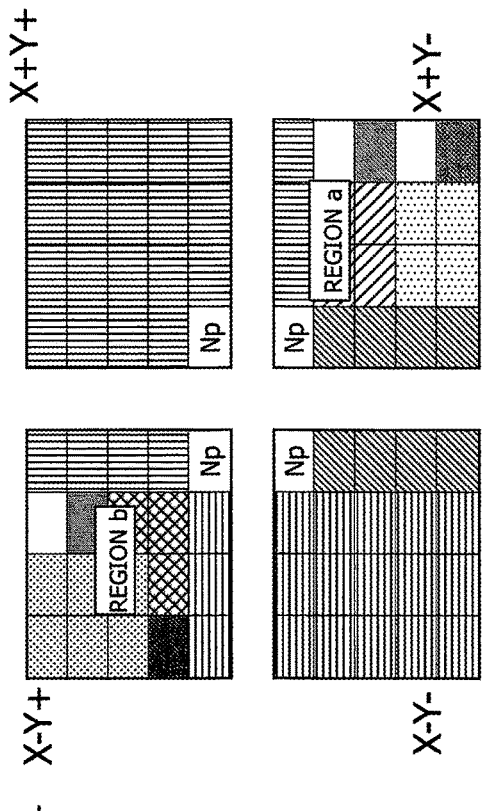
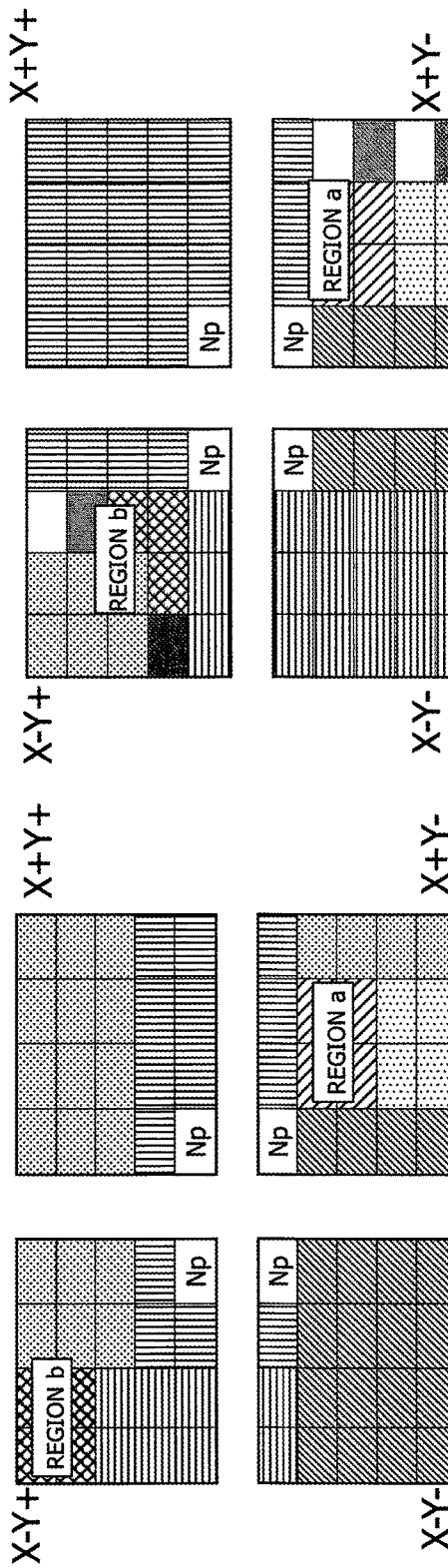

FIG. 12

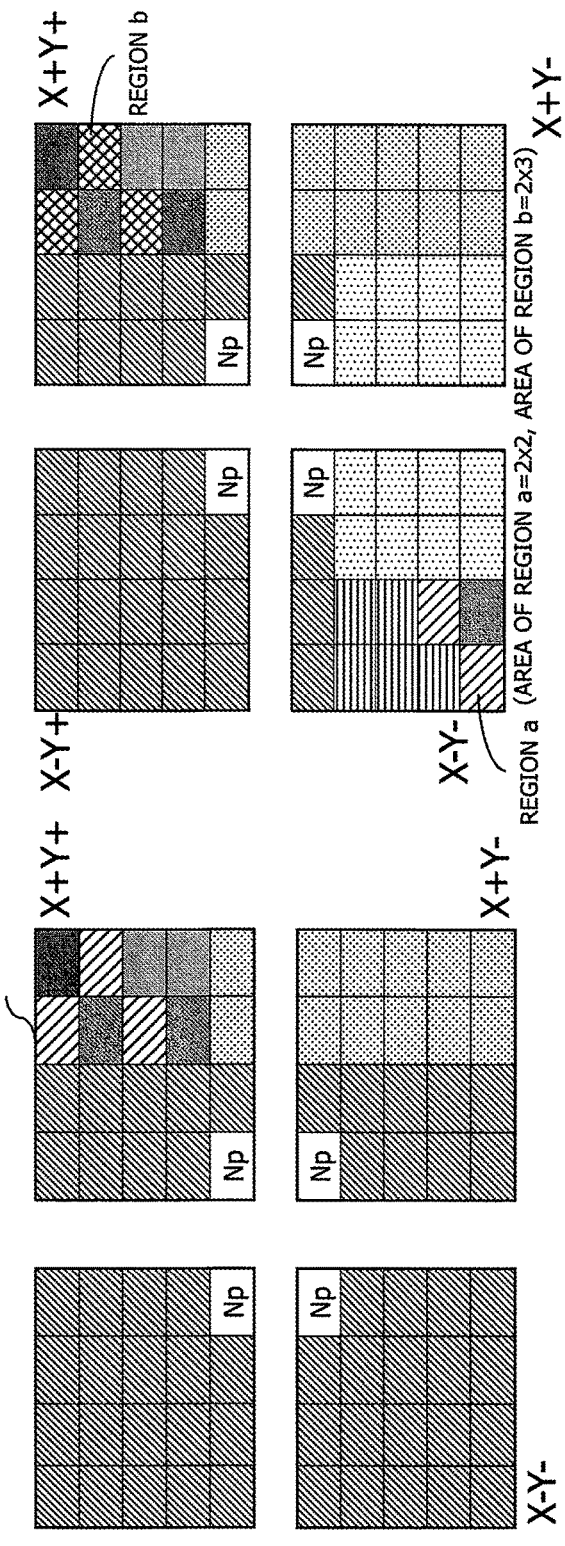

(1) EXAMPLE IN WHICH ONE REGION OF A GROUP OF DISPERSING NODES EXISTS (2) EXAMPLE IN WHICH A PLURALITY OF REGIONS OF GROUPS OF DISPERSING NODES HAVING DIFFERENT AREAS EXIST (AREA OF REGION a=2×2, AREA OF REGION b=2×3)

Np   FAILURE NODES

NODES TO WHICH JOBS HAVE BEEN ALLOCATED
VOID   FREE NODES
CANDIDATE REGION a AS DUMP-PROCESSING TARGET NODES
CANDIDATE REGION b AS DUMP-PROCESSING TARGET NODES

FIG. 13
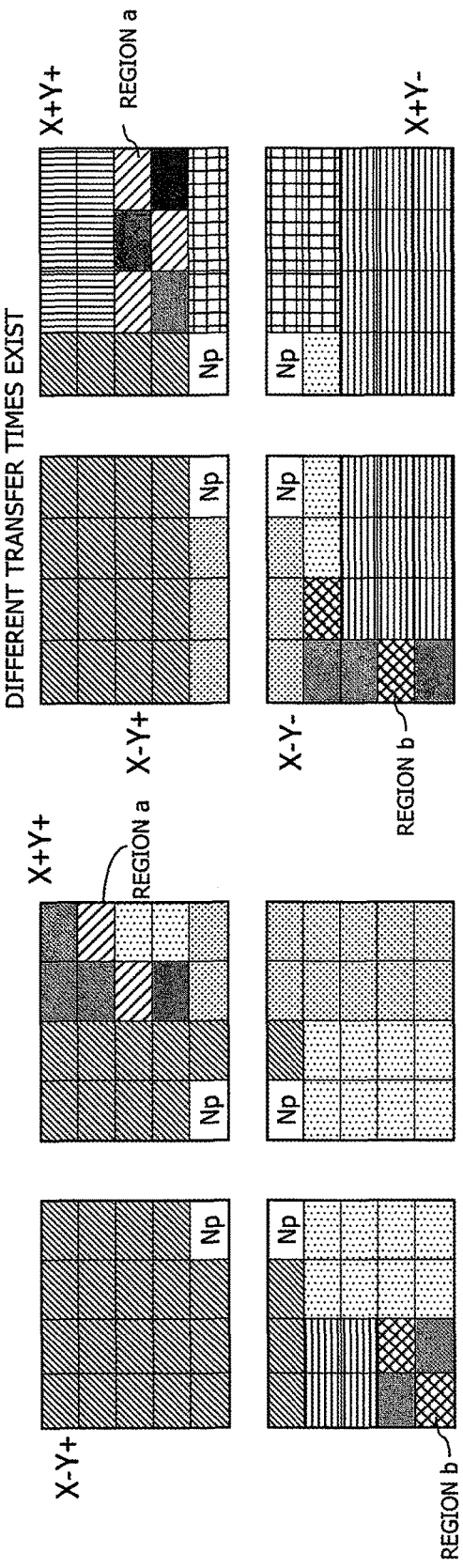
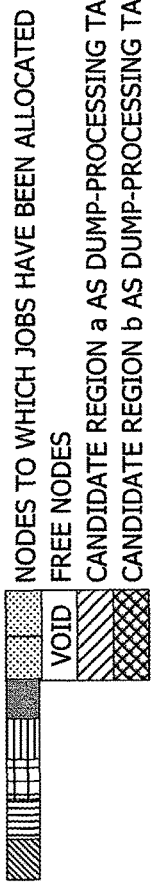

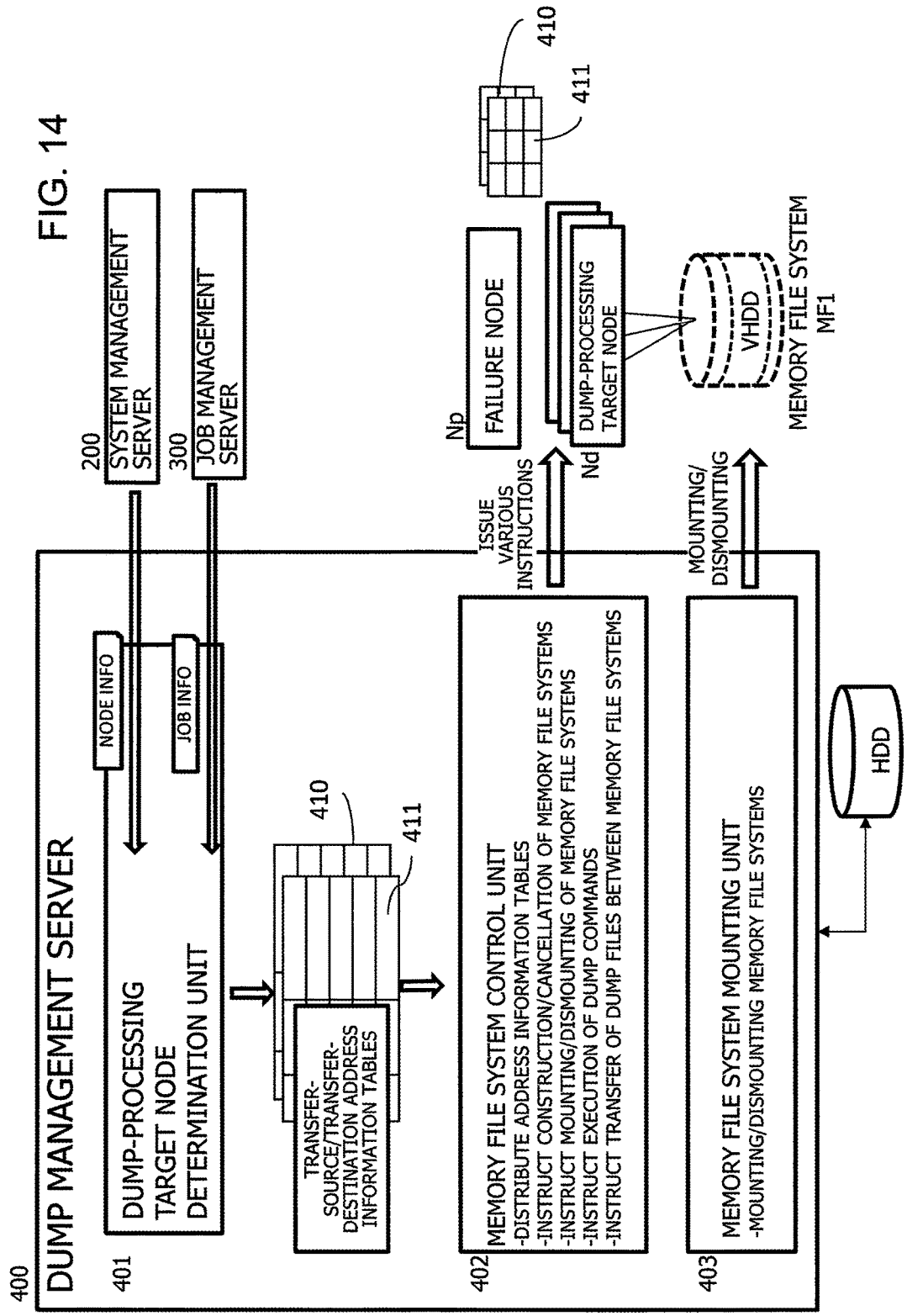

FIG. 15

ADDRESS INFORMATION TABLE OF TRANSFER-SOURCE NODE

| TRANSFER-SOURCE NODE | ADDRESS OF MEMORY OF TRANSFER-SOURCE NODE | ADDRESS OF MEMORY FILE SYSTEM |
|---|---|---|
| φ | | |

410

ADDRESS INFORMATION TABLE OF TRANSFER-DESTINATION NODE

| TRANSFER-DESTINATION NODE | ADDRESS OF MEMORY OF TRANSFER-DESTINATION NODE | ADDRESS OF MEMORY FILE SYSTEM |
|---|---|---|
| NODE 1 IP: 0001 | N1addr-s ~ N1addr-e (=N1addr-diff) | 0 ~ N1addr-diff -1 |
| NODE 2 IP: 0002 | N2addr-s ~ N2addr-e (=N2addr-diff) | N1addr-diff ~ N1addr-diff + N2addr-diff -1 |
| ... | ... | ... |
| NODE N IP: 000N | Nnaddr-s ~ Nnaddr-e (=Nnaddr-diff) | N1addr-diff + ....+ N(n-1)addr-diff + Nnaddr-diff -1 |

411

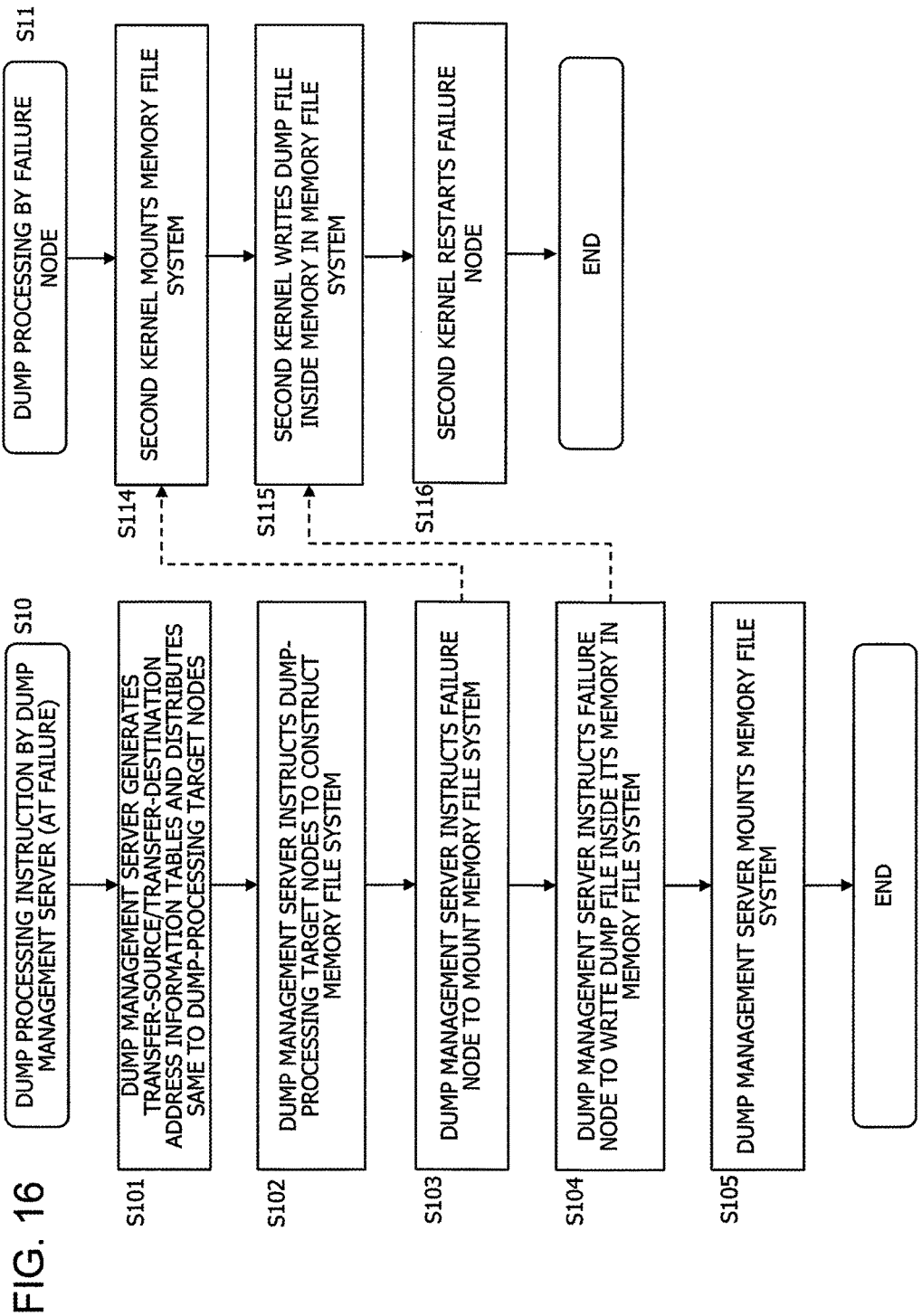

US 9,934,084 B2

DUMP MANAGEMENT APPARATUS, DUMP MANAGEMENT PROGRAM, AND DUMP MANAGEMENT METHOD

This application is based upon and claims the benefit of priority of the prior Japanese Patent Application No. 2015-112786, filed on Jun. 3, 2015, the entire contents of which are incorporated herein by reference.

FIELD

The present invention relates to a dump management apparatus, a dump management program, and a dump management method.

BACKGROUND

A parallel computer has a plurality of computer nodes (hereinafter simply called nodes) connected to each other via a network. Each of the nodes has a calculation processing unit (or a CPU), a memory (or a main memory), and an interconnect (IC) that controls communications with other nodes connected via the network and the routing of packets between the nodes.

When a trouble or a failure occurs in a node of a parallel computer, the parallel computer performs dump processing to transfer data (or a dump file) inside the memory of the failure node to a storage unit such as a HDD and analyzes the data subjected to the dump processing to examine the failure. The dump processing of a failure node is described in Japanese Patent Application Laid-open No. 2010-176345.

In general, the dump processing of data inside the memory of a failure node (hereinafter simply called dump processing) is performed on a single file server. For example, when a node fails, a dump kernel inside an operating system (OS) starts, executes dump processing to transfer data inside a memory to a single file server, and shuts down the failure node. After that, the failure node restarts to turn into an ordinary node and serves as a target to which a new job is to be allocated.

SUMMARY

However, when a plurality of nodes fail, it takes a long time to perform dump processing of data inside the memory of each of the failure nodes to a single file server since the dump processing to the single file server causes a bottleneck. In recent years, there is a likelihood that a data transfer time increases due to the large capacities of the memories of nodes. In addition, when a plurality of nodes fail, the dump processing of other failure nodes is put on hold during the dump processing of one failure node, which increases a time until the dump processing ends. As a result, since it takes a long time to shut down or restart a failure node and put the failure node into a state in which a job is allocated to the failure node again, the operation rate of the nodes reduces.

When the dump processing of a failure node is performed on the memories of other nodes in which a failure does not occur, the allocation of jobs to the other nodes is not allowed. Therefore, the operation rate of the nodes also reduces.

According to an aspect of the present disclosure is a dump management apparatus having a memory and a processor that executes a process including selecting, in response to receiving a notification of an occurrence of a failure from a failure node of a parallel computer having a plurality of nodes, a plurality of nodes that are not scheduled to execute a job within at least a first time needed to perform dump processing of a memory of the failure node and have a memory capacity needed to perform the dump processing as dump-processing target nodes from among a plurality of nodes within a reference range near the failure node; selecting the dump-processing target nodes with a first priority according to which a plurality of adjacent nodes are preferentially selected as a candidate over a plurality of dispersing nodes from among candidates for the dump-processing target nodes; and causing the failure node to transfer a dump file inside the memory of the failure node to memories of the dump-processing target nodes.

According to a first aspect, the dump processing of a failure node is accelerated while a reduction in the operation rate of nodes is prevented.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 10, 11, 12, and 13 are diagrams illustrating examples of selecting dump-processing target nodes with the respective priorities;

FIG. 14 is a diagram illustrating the functions of the dump management server;

FIG. 15 is a diagram illustrating an example of an address information table;

FIG. 16 is a flowchart illustrating a processing example of the dump processing instruction S10 by the dump management server;

DESCRIPTION OF EMBODIMENTS

Figure 1:
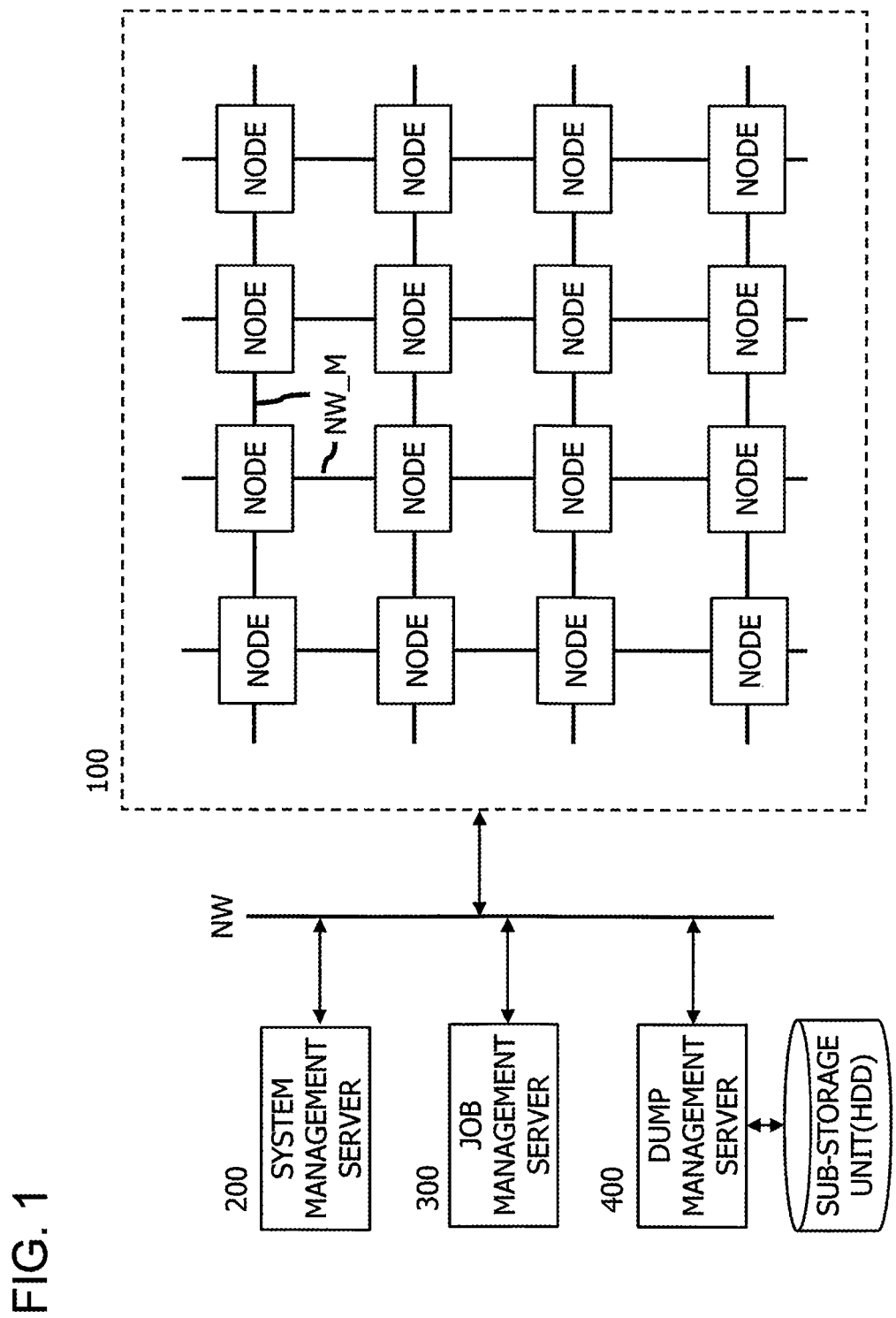
FIG. 1 is a diagram illustrating a configuration example of a parallel computer in an embodiment.

FIG. 1 is a diagram illustrating a configuration example of a parallel computer in an embodiment. The parallel computer has a multi-node unit 100 including a plurality of nodes NODE and an N-dimensional network NW_M that connects the plurality of nodes NODE to each other, a system management server 200 capable of communicating with the respective nodes inside the multi-node unit 100 (or node group 100) via a network NW, a job management server 300, and a dump management server 400. FIG. 1 illustrates a two-dimensional mesh as the N-dimensional network NW_M that connects the plurality of nodes NODE to each other to be capable of communicating with each other, but a three-dimensional mesh or an N-dimensional mesh greater than the three-dimensional mesh may be used instead. In addition, the respective nodes NODE represent information processing apparatuses (computers).

The system management server 200 manages node configuration information such as the coordinates and the IP addresses of the respective nodes and node information including operation statuses including the occurrence of failures or the active/inactive statuses of the respective nodes, the free statuses of the main memories of the nodes, or the like. The job management server 300 manages job schedule information including the allocation of jobs to the nodes.

Further, the dump management server 400 manages the dump processing of data (dump files) inside the memories of failure nodes based on the information of the system management server and the job management server. For example, when a node fails, the dump management server selects a plurality of nodes as dump-processing target nodes to which data inside the memory of the failure node is transferred in dump processing and instructs the failure node to perform the dump processing to transfer the data inside the memory of the failure node to the memories of the damp-processing target nodes. In FIG. 1, only the dump management server 400 has a sub-storage unit such as a HDD.

Figure 2:
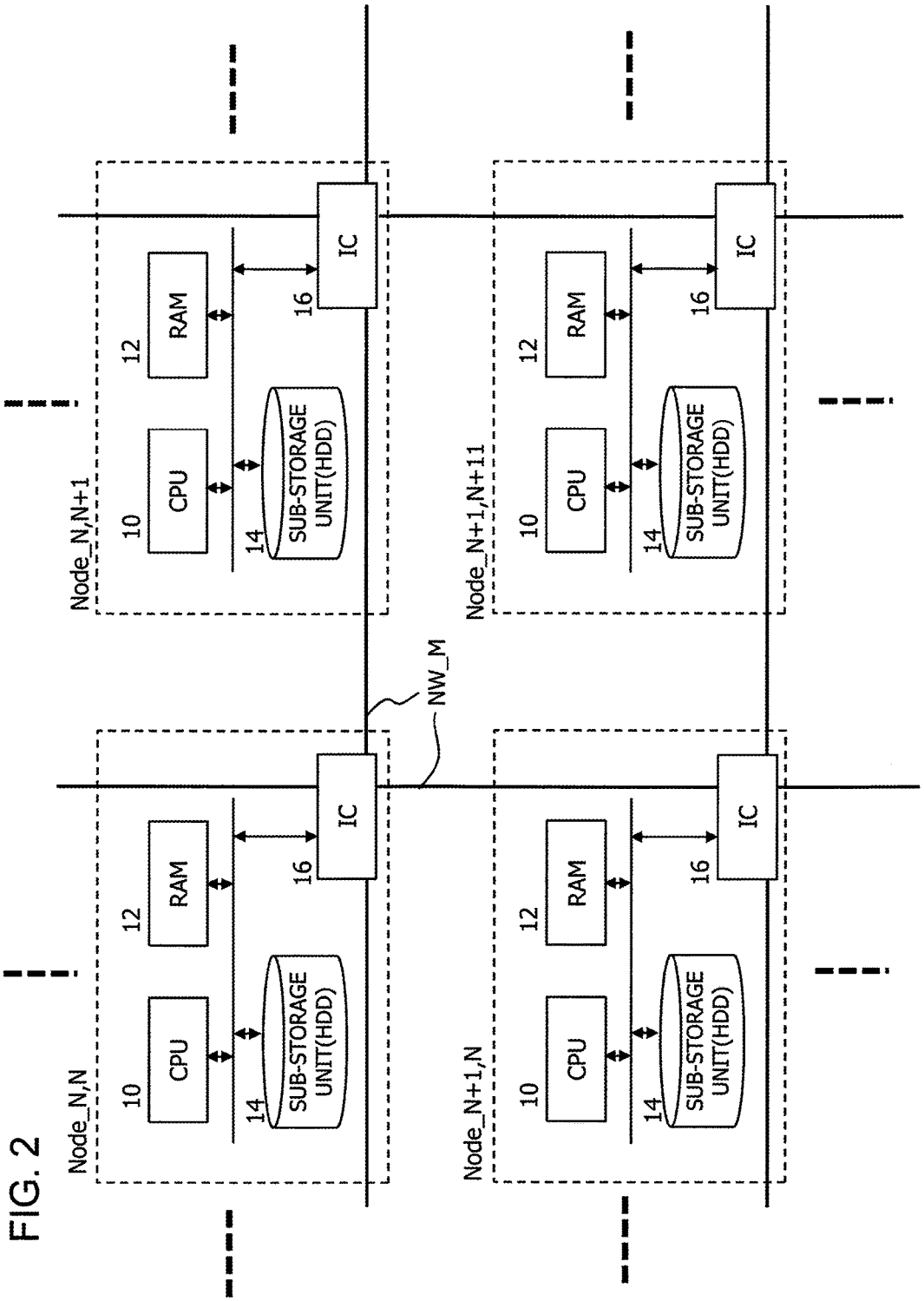
FIG. 2 is a diagram illustrating the configurations of the respective nodes and the network NW_M.

FIG. 2 is a diagram illustrating the configurations of the respective nodes and the network NW_M. In FIG. 2, four nodes Node_N,N to Node_N+1,N+1 are illustrated as a part of the plurality of nodes. For example, the node Node_N,N has an arithmetic processing unit (CPU) 10, a main memory (RAM) 12, a sub-storage unit 14 such as a HDD, and an interconnect IC. The CPU 10 loads a basic program such as an operating system (OS) or an application program inside the sub-storage unit 14 into the main memory 12 and executes the program inside the main memory.

The interconnect IC has, for example, a network router that performs the routing of packets transmitted through the network NW_M, a network interface that performs the sending/receiving of packets to/from the network, an input/output switch that connects a peripheral device (I/O device), or the like. The sub-storage unit may be connected to the input/output switch.

Outline of Dump Processing in First Embodiment

In a first embodiment, the dump management server 400 performs control to select a plurality of free nodes, to which no jobs have been allocated, as the dump processing destinations of data (dump file) inside the memory of a failure node and transfer the dump file inside the failure node to the memories of the selected plurality of free nodes (dump processing target nodes) (perform dump processing). Processing to write a dump file inside the memory (RAM) 12 of a failure node in the memories (RAMs) 12 of a plurality of free nodes is completed in a shorter time than processing to write the same in the sub-storage unit of a single dump management server 400.

Reasons for it are as follows. First, since a writing speed for a main memory is faster than a writing speed for a sub-storage unit such as a HDD, and since parallel writing in the memories of a plurality of node is allowed, therefore, writing in the memories of a plurality of nodes is performed faster than writing in the sub-storage unit of a single dump management server. In addition, when a plurality of nodes fail, dump-processing target nodes are selected for each of the failure nodes. Therefore, each of the failure nodes has no need to wait for its dump processing during the dump processing of the other failure nodes.

As a result, times for the dump processing of failure nodes and restoration processing including their subsequent restarts are shortened, which increases the number of free nodes to which jobs are capable of being allocated.

Moreover, dump files written in the memories of dump-processing target nodes are read to be analyzed. Therefore, since reading dump files from the memories of dump-processing target nodes is performed faster than reading dump files from the single sub-storage unit (HDD), user's dump analysis is efficiently performed.

However, first, in order to shorten the restoration time of a failure node, the dump management server desirably performs the selection processing of a plurality of dump-processing target nodes in a short time.

Second, jobs are allocated to the nodes inside the multi-node unit 100, and the nodes have a need to process the jobs. Accordingly, when, it is desirable that the dump processing by using selected free nodes prevents a difficulty in the allocation of jobs to the free nodes after the occurrence of a failure.

In order to meet the above first requirement, the dump management server selects, for example, dump-processing target nodes from among free nodes near a failure node. By limiting candidates for target nodes, the dump management server completes the selection processing of dump-processing target nodes in a short time. In addition, since the dump management server selects dump-processing target nodes only from among free nodes near a failure node, it is possible to reduce an impact on the selection of dump-processing target nodes for another failure node distant from the failure node.

In addition, in order to meet the second requirement, the dump management server preferentially selects, for example, a plurality of adjacent nodes as a candidate over a plurality of scattering nodes from among candidates for dump-processing target nodes. When dump-processing target nodes are positioned in an adjacent fixed region so as to be as close as possible to each other, the job management server is allowed to easily allocate jobs to a plurality of adjacent nodes in a fixed region from free nodes other than the dump-processing target nodes. Thus, a trouble and an impact on the allocation of jobs caused when dump-processing target nodes are used for dump processing are reduced.

Further, the memories of nodes are expensive memory resources compared with sub-storage units such as HDDs. Therefore, dump files inside the memories of dump-processing target nodes are desirably saved on a sub-storage unit such as the HDD of a file server including the dump management server. Accordingly, dump files desirably remain in the memories of dump-processing target nodes in a certain time or less. For this reason, the dump management server uses some of free nodes as dump-processing target nodes when there are enough free nodes, but saves dump files inside dump-processing target nodes in the sub-storage unit of a file server when there are not enough free nodes or when a certain time elapses from dumping.

(Dump Processing by Dump Management Server)

The dump management server has the same configurations as those of the nodes of FIG. 2. Further, a sub-storage unit 14 of the dump management server stores, besides a basic program such as OS, a dump processing program for controlling the dump processing of a failure node and a dump-file viewing program that allows a user to view dump files and perform a desired analysis. A CPU 10 of the dump management server executes the dump processing program to perform the dump processing of a failure node and runs the dump-file viewing program to perform the viewing processing of dump files.

Figure 3:
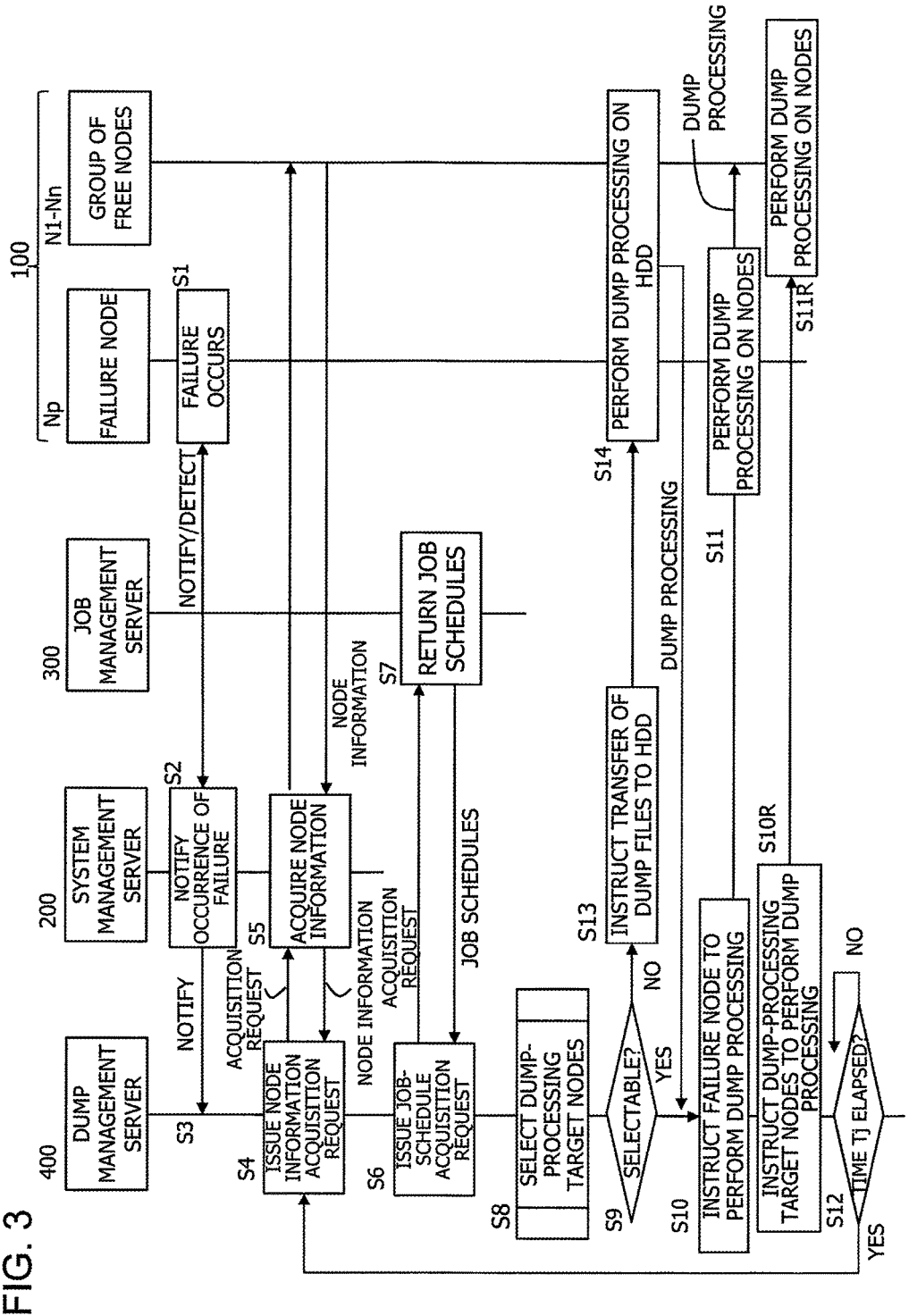
FIG. 3 is a flowchart illustrating the dump processing of a failure node by the dump management server in the embodiment.

FIG. 3 is a flowchart illustrating the dump processing of a failure node by the dump management server in the embodiment. FIG. 3 illustrates the respective processing of the dump management server 400, the system management server 200, the job management server 300, the multi-node unit 100 including a failure node Np and a group of free nodes N1 to Nn.

When a node Np fails (S1), the ordinary kernel of the OS of the failure node Np starts a dump kernel to notify the system management server 200 of the occurrence of the failure. Alternatively, the system management server 200 detects the failure of the node Np by its periodical processing to monitor a node status. In response to it, the system management server 200 notifies the dump management server 400 of the occurrence of the failure (S2 and S3).

In response to the reception of the notification of the occurrence of the failure (S3), the dump management server 400 issues a node-information acquisition request to the system management server 200 (S4). The requested node information includes, for example, the identification information (IDs or coordinates), the free capacities of the memories, or the like of the free nodes N1 to Nn and represents information needed to select dump-processing target nodes to which a dump file inside the memory of the failure node is transferred.

In response to the node-information acquisition request, the system management server accesses the group of free nodes to acquire the node information (S5). The interconnects IC of the respective nodes have, for example, a hardware function to return the node information in response to the reception of a packet that requests for the sending of the node information. The node information includes information such as the free capacities of the memories. With the use of the function, the system management server 200 collects the node information easily and at high speed (S5).

As described above, the dump management server 400 selects the dump-processing target nodes from among free nodes near the failure node Np.

Accordingly, the dump management server issues the node-information acquisition request only to free nodes within a certain reference range near the failure node Np. In this way, the system management server 200 completes the node-information acquisition processing in a short time.

Next, the dump management server 400 issues a job-schedule acquisition request to the job management server 300 (S6). In response to the acquisition request, the job management server returns information on the requested job schedules to the dump management server. In this case as well, the job management server may acquire the schedules of the nodes within the reference range near the failure node. In addition, the dump management server selects the dump-processing target nodes from among free nodes to which no jobs are to be allocated within at least a first time for the dump processing since a present time. Accordingly, information on the free nodes to which no jobs are to be allocated within the first time may be returned as the information on the job schedules. The first time is, for example, at least a time for the dump processing or more, or may be a time in which a certain time for failure analysis is added to the time for the dump processing.

Then, the dump management server selects the dump-processing target nodes from among the free nodes N1 to Nn based on the node information and the job schedule information acquired as described above (S8).

A selection algorithm will be described in detail later.

When the dump-processing target nodes are selectable from among the free nodes N1 to Nn (YES in S9), the dump management server requests the failure node to perform the dump processing of data inside its memory (S10). In response to the request, the dump kernel of the failure node performs dump processing to transfer the data inside the memory of the failure node in parallel to the memories of the dump-processing target nodes (S11). The dump processing includes processing to transfer a dump file inside the memory to the dump destinations, processing to shutdown or restart of the failure node, or the like.

On the other hand, when dump-processing target nodes are not selectable (NO in S9), the dump management server instructs the failure node to perform dump processing to the sub-storage unit of the dump management server (S13). In response to the request, the dump kernel of the failure node performs the dump processing to transfer the data inside the memory of the failure node to the sub-storage unit of the dump management server (S14). In the same way as the above, the dump processing includes processing to transfer the dump file inside the memory to the dump destination, and processing to shutdown or restart of the failure node, or the like.

After the dump processing, the dump management server is made accessible to the memories of the dump-processing target nodes (not illustrated). As a result, a user reads the dump file and performs failure analysis via the dump management server. As a method for being accessible to the memories of the dump-processing target nodes, the installation of a file system that uses the memories of the dump-processing target nodes as its storage media is, for example, desirable. The file system will be described in detail later.

Similarly, as a method for causing the failure node to transfer the dump file inside the memory of the failure node to the memories of the dump-processing target nodes to be written, the installation of the above file system in the failure node is desirable. Thus, the dump kernel of the failure node may only perform processing to transfer the data inside the memory to the file system inside the failure node.

When a first time Tj elapses after the dump processing (YES in S12), the dump management server 400 again performs the node-information acquisition request (S4), the job-schedule acquisition request (S6), and the selection of dump-processing target nodes (S8). Then, when new dump-processing target nodes are selectable (YES in S9), the dump management server requests the current (old) dump-processing target nodes to perform processing to transfer dump files inside the memories of the current (old) dump-processing target nodes to the memories of the new dump-processing target nodes (S10R). On the other hand, when new dump-processing target nodes are not selectable (NO in S9), the dump management server instructs the current (old) dump-processing target nodes to perform the dump processing of the dump files inside their memories to the sub-storage unit of the dump management server (S13). In response to the request, the current (old) dump-processing target nodes transfer the data inside the memories to the sub-storage unit of the dump management server to perform the dump processing (S14). Alternatively, the dump management server may write the dump files inside the memories of the current (old) dump-processing target nodes in the sub-storage unit such as the HDD of the dump management server by using installed file system.

As described above, the dump-processing target nodes maintains storing the dump files in their memories during the first time Tj. When the first time Tj elapses, the dump-processing target nodes transfer the dump files to new dump-processing target nodes selected from among free nodes to which no jobs are to be allocated in the first time Tj from this point. Thus, an impact or a trouble on the allocation of the jobs to the nodes is reduced to a greater extent.

(Selection of Dump-Processing Target Nodes)

Figure 4:
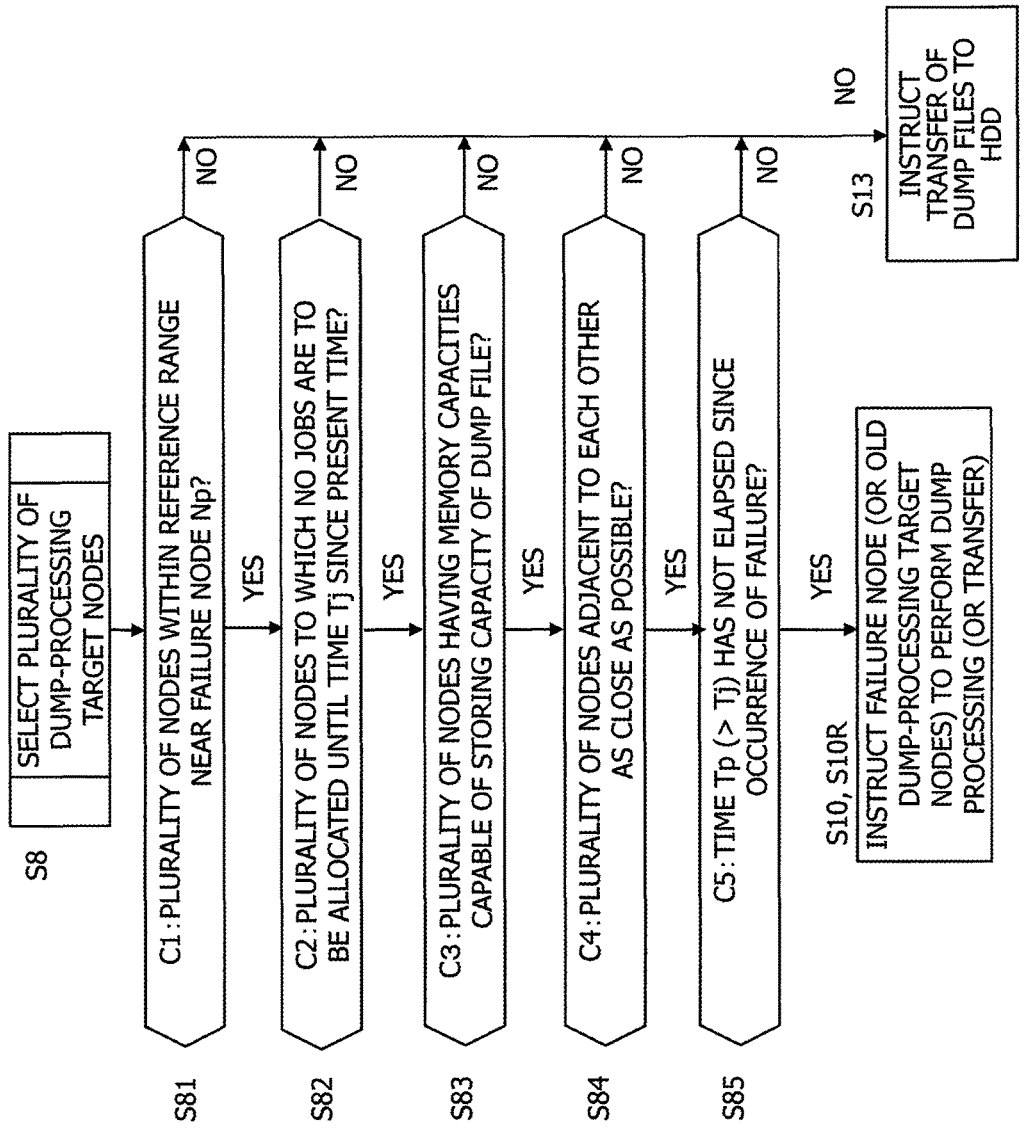
FIG. 4 is a flowchart illustrating the processing S8 for selecting dump-processing target nodes.

FIG. 4 is a flowchart illustrating the processing S8 for selecting dump-processing target nodes. The dump management server selects a plurality of dump-processing target nodes under conditions C1 to C4 illustrated in FIG. 4. In addition, the management server selects a plurality of dump-processing target nodes under a temporal condition C5.

Figure 5:
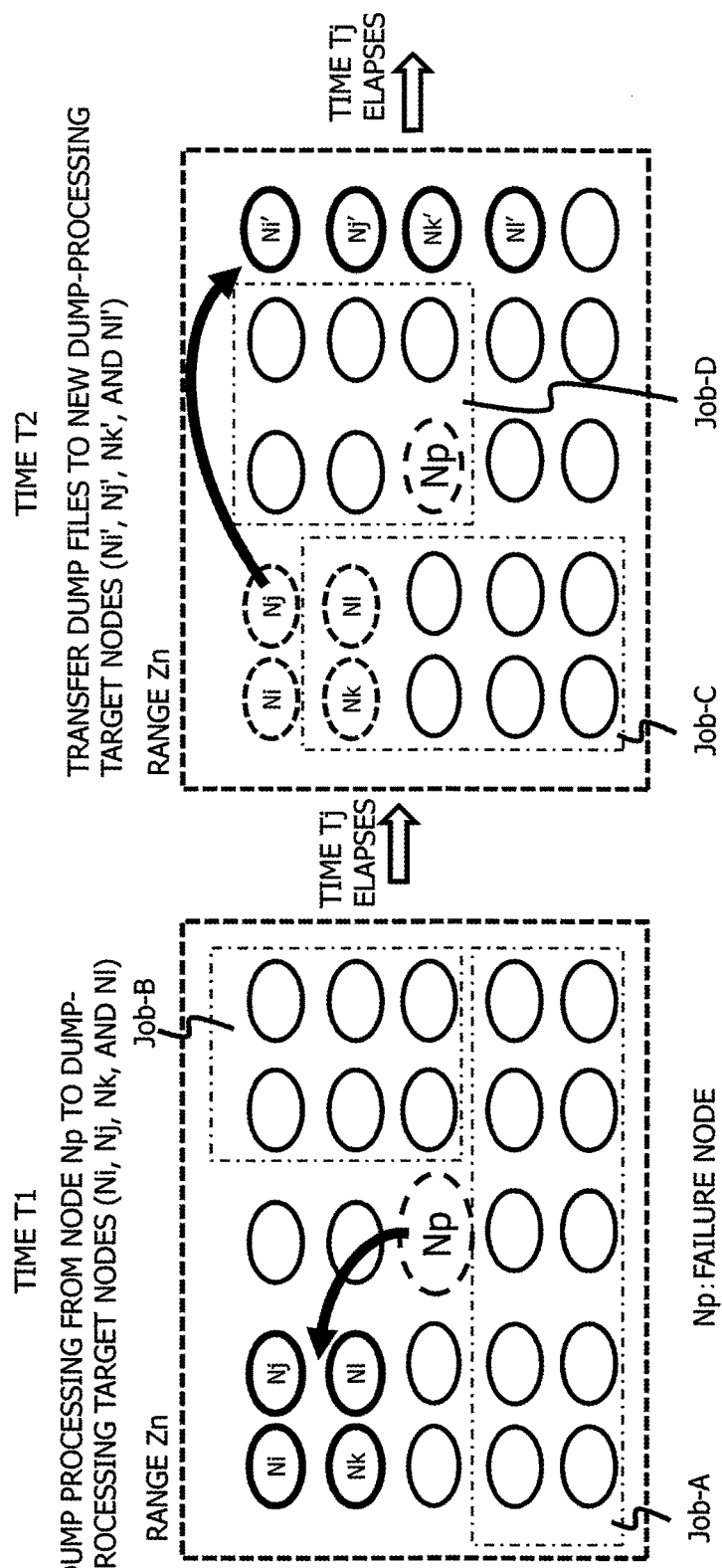
FIGS. 5 and 6 are diagrams illustrating an example of the selection of dump-processing target nodes and the dump processing (dump-file transfer processing)
Figure 6:
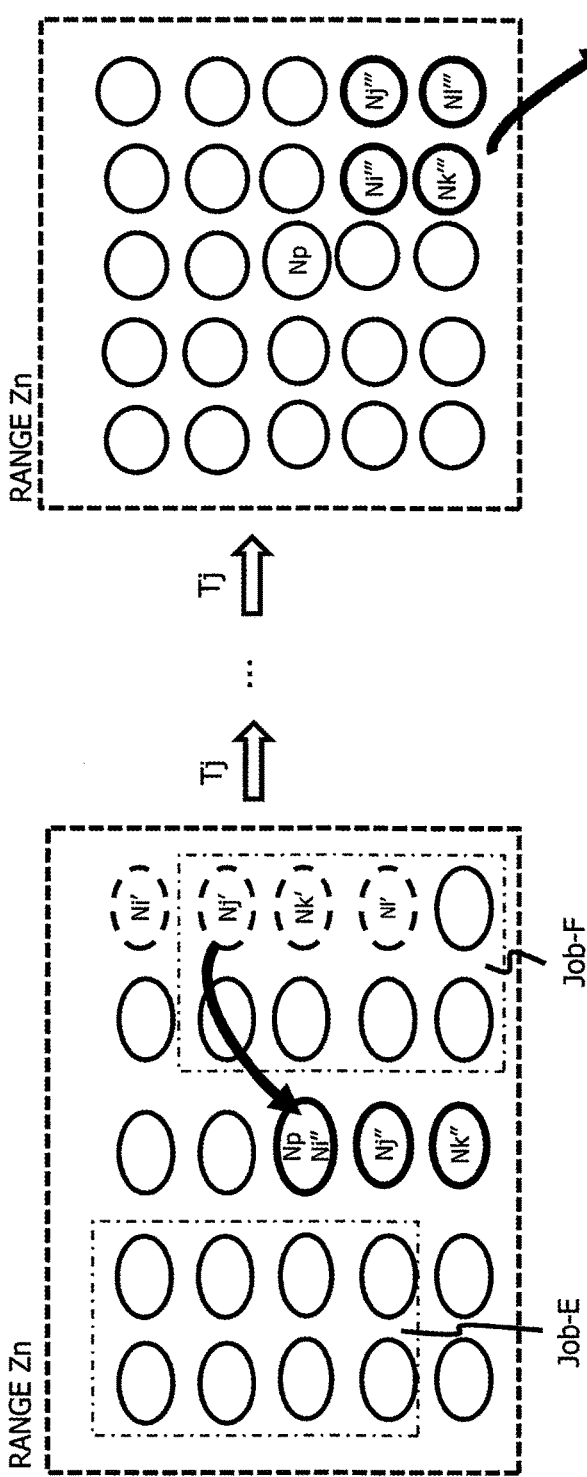

FIGS. 5 and 6 are diagrams illustrating an example of the selection of dump-processing target nodes and the dump processing (dump-file transfer processing). A reference is suitably made to FIGS. 5 and 6 to describe FIG. 4.

In FIG. 4, the dump management server selects a plurality of dump-processing target nodes under the condition C1 as to whether the plurality of nodes (free nodes) exist within a reference range near a failure node Np (S81). At a time T1 of FIG. 5, an example of a reference range Zn near the failure node Np is illustrated. In the example, the reference range Zn represents a rectangular range in which the number of the transfer hops of packets from the failure node Np is four at a maximum. That is, the reference range Zn represents a rectangular range including respective two nodes in a horizontal direction about the failure node Np and respective two nodes in a vertical direction about the failure node Np.

The dump management server selects a plurality of free nodes to be subjected to the dump processing from among free nodes within the reference range Zn. At the time T1 of FIG. 5, the dump management server selects a group of four free nodes (Ni, Nj, Nk, and Nl) within the reference range Zn. Since the dump management server searches for dump-processing target nodes only within the limited range Zn near the failure node Np, its searching processing is simplified and completed in a short time. Thus, the dump processing is completed in a short time. On the other hand, when the dump management server selects nodes distant from the failure node Np as dump-processing target nodes, it takes a long time to transfer a dump file in the dump processing. In addition, there is a likelihood that dump-processing target nodes for another failure node distant from the failure node Np are positioned near the failure node Np on the contrary. For this reason, it is not desirable to select nodes distant from the failure node Np as dump-processing target nodes.

In FIG. 4, the dump management server selects a plurality of dump-processing target nodes under the condition C2 as to whether no jobs are to be allocated to the plurality of nodes (free nodes) until a first time Tj since a present time (S82). The first time Tj represents at least a time for transferring a dump file in the dump processing or more, or may include a time for failure analysis in the time for transferring the dump file. In the memories of the selected dump-processing target nodes, the dump file is to be saved during the first time Tj. Accordingly, it is desirable to select a plurality of nodes to which no jobs are to be allocated according to job schedules known at the present time. When free nodes to which jobs are to be allocated within the first time Tj are selected, a dump file is not allowed to be saved during the first time Tj.

In FIG. 4, the dump management server selects a plurality of dump-processing target nodes under the condition C3 as to whether the plurality of nodes (free nodes) have a memory capacity capable of storing the capacity of a dump file inside the memory of the failure node Np (S83). That is, the dump management server selects the plurality of nodes under the condition that the sum of the free capacities of the memories of the plurality of nodes is greater than the capacity of the dump file.

Then, in FIG. 4, the dump management server selects a plurality of dump-processing target nodes under the condition C4 as to whether the plurality of adjacent nodes (free nodes) are as close as possible to each other (S84). Under the condition C4, the dump management server is requested to select a plurality of nodes positioned within a region as narrow as possible rather than selecting a plurality of adjacent nodes, for example, a plurality of adjacent nodes within a rectangular region. For example, when a plurality of adjacent nodes and a plurality of dispersing nodes are available as candidates, the dump management server selects the plurality of adjacent nodes with priority. The priority will be described in detail later. At the time T1 of FIG. 5, the dump management server selects the four free nodes (Ni, Nj, Nk, and Nl) adjacent to each other. In addition, in the example of the time T1 of FIG. 5, the four free nodes (Ni, Nj, Nk, and Nl) are positioned within the rectangular region of a regular tetragon, i.e. 2×2.

The job management server performs the allocation of jobs independently of the dump processing by the dump management server. Accordingly, it is not guaranteed that the job management server will not need to allocate jobs to free nodes during the first time Tj even if no jobs have been allocated to the free nodes at a present time. In other words, the job management server may have a need to allocate jobs within the time Tj. Accordingly, since the dump management server selects dump-processing target nodes as close as possible to each other within a narrow range, an impact or a trouble on the allocation of jobs to free nodes will be reduced in the future.

In addition, since the dump management server selects dump-processing target nodes from among a plurality of adjacent nodes within a narrow range, it is expected that it takes a short time to transfer a dump file from a failure node Np to the dump-processing target nodes.

In FIG. 4, the dump management server selects a plurality of dump-processing target nodes under the condition C5 as to whether a second time Tp (>Tj) elapses since the occurrence of a failure (S85). In the first embodiment, when the second time Tp elapses since the occurrence of a failure, the system management server stops using free nodes within the multi-node unit (node group) 100 as dump-processing target nodes, transfers a dump file to the sub-storage unit (HDD or the like) of the dump management server or the like, and releases the dump-processing target nodes to be added to job allocation target nodes. This is because it is not desirable to store the dump file in the memories of the relatively-expensive nodes for such a long time period of Tp.

When all the above conditions C1 to C5 are met, dump-processing target nodes are made selectable. In this case, the dump management server instructs a failure node to transfer a dump file inside the memory of the failure node to the memories of the dump-processing target nodes (S10). After the first time Tj elapses since the occurrence of the failure, the dump management server controls dump files inside the memories of old dump-processing target nodes to be transferred to the memories of new dump-processing target nodes (S10R).

On the other hand, when any of the conditions C1 to C5 is not met, the dump management server instructs a failure node to transfer a dump file inside the memory of the failure node to the file server or the sub-storage unit (such as the HDD) of the dump management server (S13). After the time Tp elapses since the occurrence of the failure, the dump management server controls dump files inside the memories of old dump-processing target nodes to be transferred to the sub-storage unit (S13).

A description will be given of an example of the selection of dump-processing target nodes and the dump processing or the dump-file transfer processing illustrated in FIGS. 5 and 6. At the time T1 of FIG. 5, a node Np fails. In this case, the dump management server selects four free nodes (Ni, Nj, Nk, and Nl) indicated by thick frames as dump-processing target nodes from among free nodes, to which no jobs are to be allocated, within a reference range Zn near the failure node Np. The dump management server selects the free nodes according to the method illustrated in FIG. 4. Then, the dump management server causes the failure node Np to transfer a dump file inside the memory of the failure node Np to the memories of the dump-processing target nodes (Ni, Nj, Nk, and Nl). A method for transferring the dump file will be described in detail later. After that, the failure node Np shuts down or restarts and then turns into a job allocation target node.

At a time T2 after the elapse of a first time Tj, the dump management server newly selects four free nodes (Ni', Nj', Nk', and Nl') indicated by thick frames within the reference range Zn as new dump-processing target nodes and controls dump files inside the memories of the current (old) dump-processing target nodes (Ni, Nj, Nk, and Nl) to be transferred to the memories of the new dump-processing target nodes. A method for transferring the dump files will be described in detail later.

At the time T2, the failure node Np restarts, and a job Job-D is newly allocated to the failure node Np. In addition, after the time T2, a job job-C is newly allocated to some of the old dump-processing target nodes, i.e., the nodes Nk and Nl.

In FIG. 6, at a time T3 after the elapse of the first time Tj since the time T2, the dump management server selects three free nodes (Ni", Nj", and Nk") within the reference range Zn as new dump-processing target nodes and controls dump files inside the memories of the current (old) dump-processing target nodes (Ni", Nj", Nk", and Nl") to be transferred to the memories of the new dump-processing target nodes. The new dump-processing target nodes (Ni", Nj", and Nk") include the node Np that failed at the time T1 but has shut down or restarted after transferring the memory and has turned into a job allocation target node.

Then, at a time TX at which the first time Tj elapses a few times since the time T3 and a second time Tp elapses since the occurrence of the failure, the dump management server controls dump files inside the memories of current (old) dump-processing target nodes (Ni''', Nj''', Nk''', and Nl''') to be transferred to the sub-storage unit (HDD) for storing dump files inside the dump management server.

As described above, a dump file inside the memory of a failure node is transferred to the memories of dump-processing target nodes selected from among free nodes to which no jobs are to be allocated during the first time Tj at the failure of the node. Then, after the elapse of the first time, new dump-processing target nodes are selected from among free nodes to which no jobs are to be allocated during the first time Tj at this point, and dump files inside the memories of the current (old) dump-processing target nodes are transferred to the memories of the new dump-processing target nodes.

In the way described above, dump files are transferred to the memories of free nodes to which no jobs are to be allocated at each point, and the failure analysis of the dump files is allowed until the elapse of the first time. However, the dump files are prevented from being saved in the same dump-processing target nodes beyond the first time. Thus, an impact or a trouble on the allocation of jobs is reduced. In addition, in order to reduce an impact or a trouble on the allocation of jobs in the future, a plurality of adjacent nodes are selected as dump-processing target nodes with priority.

Figure 7:
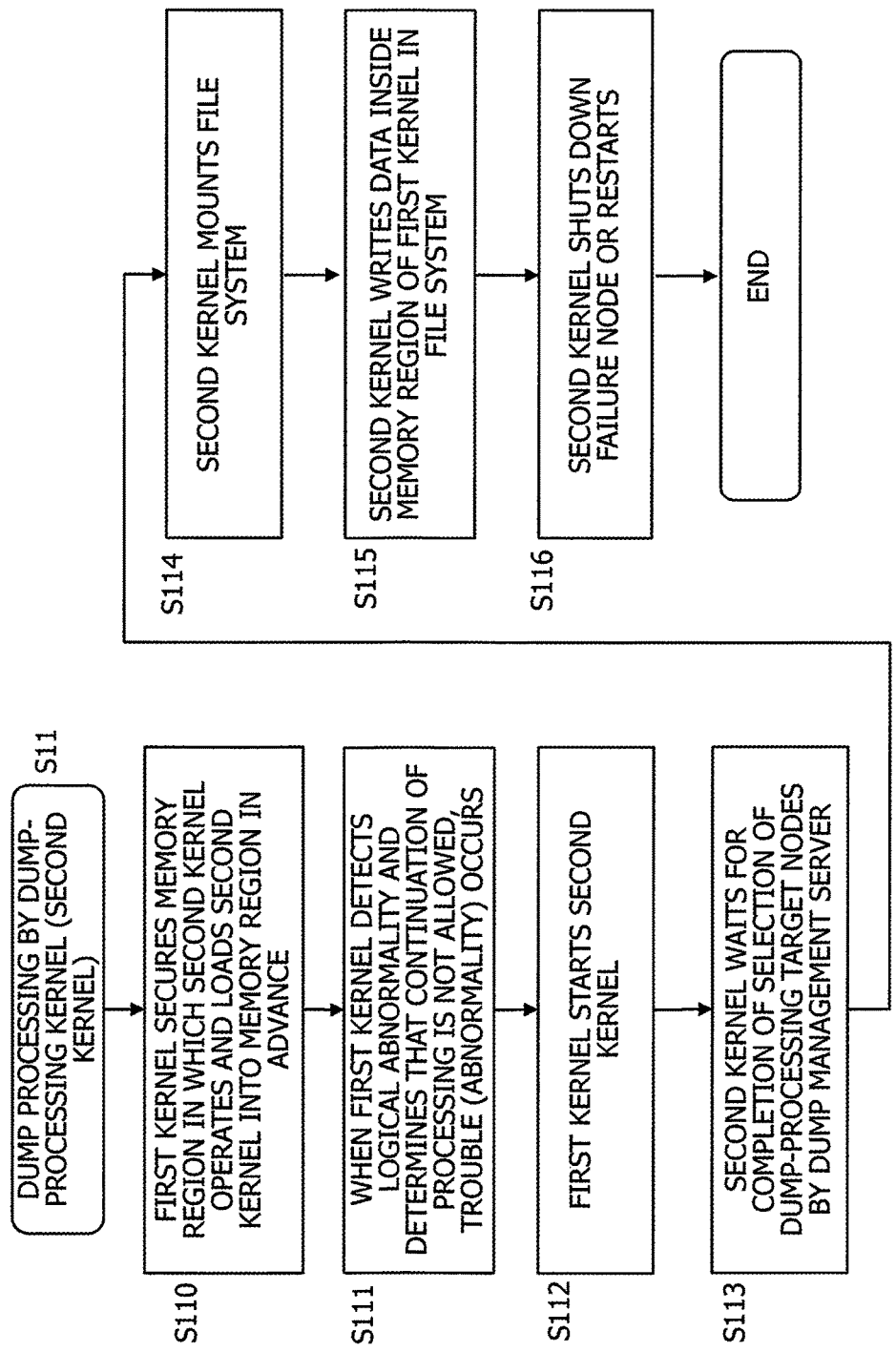
FIG. 7 is a flowchart illustrating the dump processing by the dump processing kernel of a failure node.

FIG. 7 is a flowchart illustrating the dump processing by the dump processing kernel of a failure node. FIG. 7 also includes the entire processing by the kernel when the node fails.

The OS of each node has a first kernel that performs ordinary control such as job management and storage management and a second kernel (dump processing kernel) that performs control when the node fails. Further, in each node, the first kernel secures a memory region in which the second kernel operates and loads the second kernel into the memory region in advance (S110). Then, when the first kernel detects logical abnormality or the like in its processing and determines that the continuation of the processing is not allowed, a trouble (abnormality) occurs (S111). As a result, the first kernel starts the second kernel (S112).

Here, the second kernel of the failure node waits for the completion of the selection of a plurality of dump-processing nodes by the dump management server (S113). Then, when receiving an instruction for the dump processing from the dump management server, the second kernel mounts a file system that uses the memories of dump-processing target nodes as storage media (S114). The file system will be described in detail later. The virtual file system that uses the memories of the dump-processing target nodes as storage media is mounted on the failure node.

The second kernel writes data (dump file) inside the memory region of the first kernel in the virtual file system (S115). As a result, the dump file inside the memory of the failure node is transferred to the memories of the plurality of dump-processing target nodes representing the storage media of the virtual file system. Finally, the second kernel shuts down or restarts the own failure node (S116).

In the dump processing by a general second kernel, a dump file inside a memory is written in the sub-storage unit of its own file system, and the second kernel itself shuts down or restarts. Conversely, in the embodiment, a second kernel writes a dump file inside its memory in a virtual file system that uses the memories of dump-processing target nodes as storage media, whereby the dump file is transferred to the memories of the dump-processing target nodes of the dump file.

Figure 8:
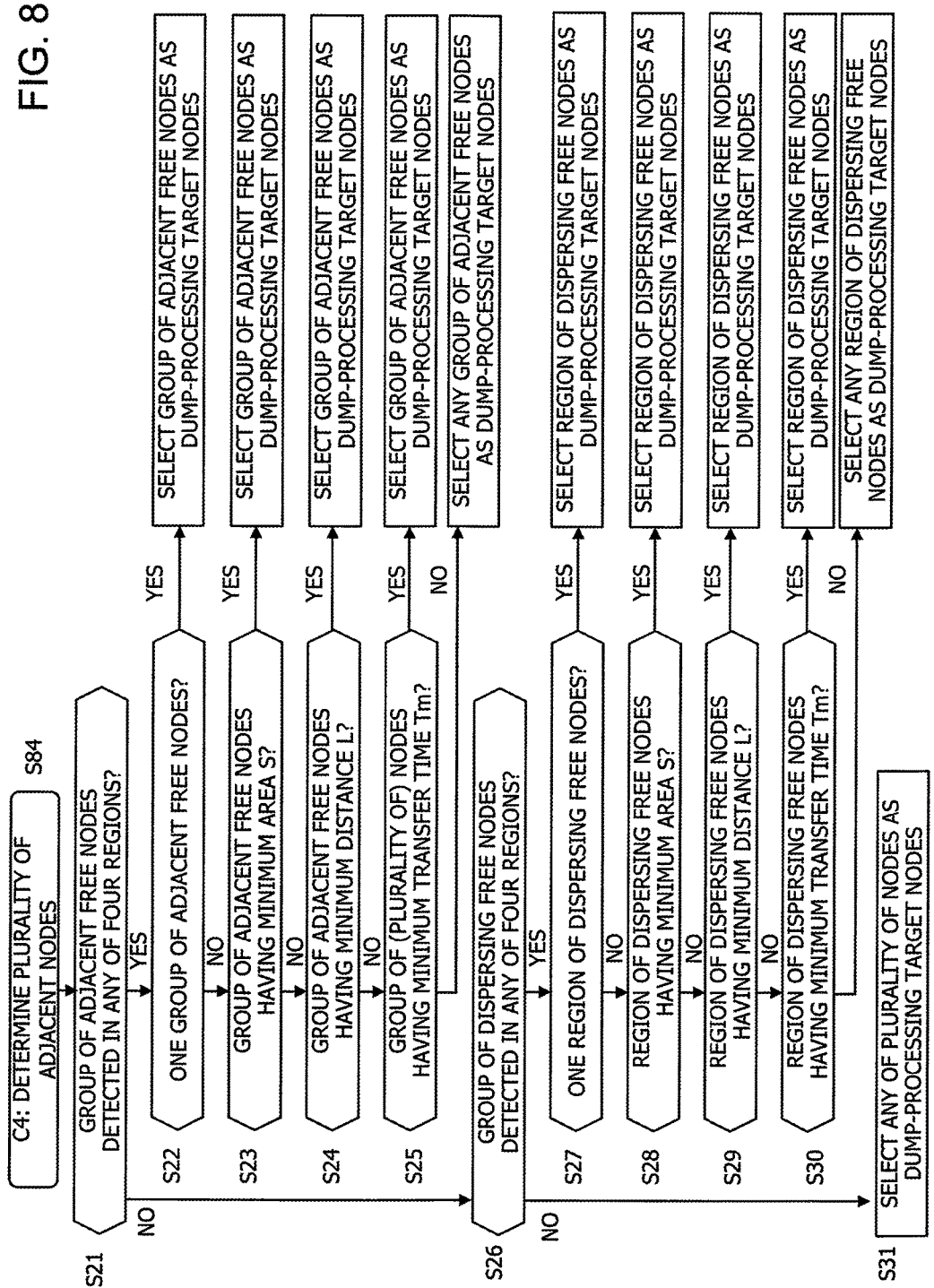
FIG. 8 is a flowchart of the condition C4, i.e., the processing S84 in which a plurality of adjacent nodes as close as possible to each other are selected as processing to select dump-processing target nodes.

FIG. 8 is a flowchart of the condition C4, i.e., the processing S84 in which a plurality of adjacent nodes as close as possible to each other are selected as processing to select dump-processing target nodes.

Figure 9:
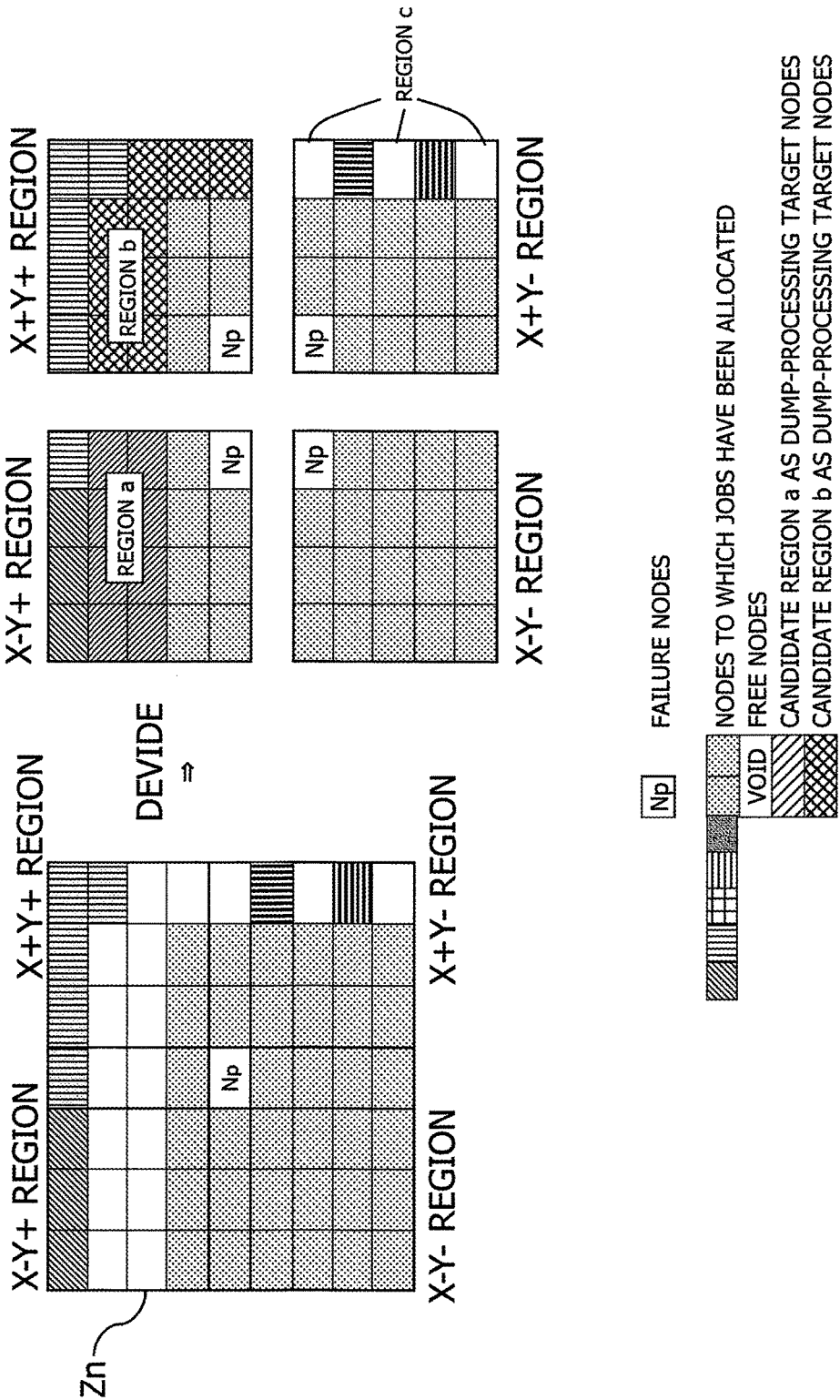
FIG. 9 is a diagram illustrating an example referred to describe the processing of FIG. 8.

In addition, FIG. 9 is a diagram illustrating an example referred to describe the processing of FIG. 8.

The dump management server 400 performs the selection processing of dump-processing target nodes illustrated in FIG. 4 to select, as selection candidates, free nodes to which no jobs are to be allocated during at least a first time Tj, which have memory capacities capable of storing a dump file, and which are positioned in a reference range Zn near a failure node Np (S81, S82, and S83).

Then, the dump management server selects, as dump-processing target nodes (a group of free nodes), a plurality of adjacent nodes as close as possible to each other according to the flowchart of FIG. 8 illustrating in detail step S84 of FIG. 4. Specifically, the dump management server evaluates each of candidates for dump-processing target nodes meeting the conditions C1, C2, and C3 of FIG. 4 and selects the dump-processing target nodes with certain priority.

First, as illustrated on a left side in FIG. 9, the dump management server divides the region of a reference range Zn near a failure node Np into four regions in which the positive (X+) and the negative (X−) of an X axis and the positive (Y+) and the negative (Y−) of a Y axis with the failure node Np as an origin are combined with each other as illustrated on a right side in FIG. 9. That is, the dump management server divides the region of the reference range Zn into the four regions, i.e., an X+Y+ region, an X−Y+ region, an X−Y− region, and an X+Y−region. In this way, the searching range of optimum dump-processing target nodes is restricted to a certain extent, whereby the searching processing of the dump management server is simplified.

Second, the dump management server selects dump-processing target nodes with a first priority according to which a plurality of adjacent nodes are preferentially selected as a candidate over a plurality of dispersing nodes. With the selection of a plurality of adjacent nodes as dump-processing target nodes, there is a less impact on task allocation processing in which tasks are allocated to adjacent nodes with priority.

In the example of FIG. 9, the dump management server selects free nodes (void nodes) to which no jobs are allocated on the left side as a candidate region a inside the X−Y+ region, a candidate region b inside the X+Y+ region, and a candidate region c inside the X+Y− region in the four divided regions on the right side. In this case, the candidate region a forms a rectangular region in which eight nodes are all adjacent to each other, the candidate region b forms a rectangular region (partially bent) in which nine nodes are adjacent to each other, and the candidate region c forms a region in which three nodes disperse. Accordingly, the dump management server selects, as dump-processing target nodes, the candidate regions a and b having a group of adjacent nodes from among the three candidates with the first priority.

Third, in each of a rectangular region including a group of adjacent nodes and a region including a group of dispersing nodes, the dump management server selects dump-processing target nodes with a second priority according to which a plurality of nodes positioned in a smaller area of a region are preferentially selected as a candidate over a plurality of nodes positioned in a larger area of a region. When a plurality of adjacent nodes are as close as possible to each other, their smaller area results in a less impact on the allocation of jobs. The second priority is lower in level than the first priority.

In the example of FIG. 9, the area of the candidate region a is 8 (=2×4), and the area of the candidate region b is 16 (=4×4). Therefore, the dump management server selects the candidate region a with the second priority. Note that an area S is calculated according to the following formula. According to the formula, the area is calculated based on the maximum and minimum X and Y coordinates among a plurality of X and Y coordinates. Therefore, the area of a minimum rectangle accommodating a plurality of nodes is eventually calculated.

Area $S=$(maximum $X$ coordinate−minimum $X$ coordinate+1)×(maximum $Y$ coordinate−minimum $Y$ coordinate+1)

Fourth, in each of a rectangular region including a group of adjacent nodes and a region including a group of dispersing nodes, the dump management server selects dump-processing target nodes with a third priority according to which a plurality of nodes positioned in a region with a shorter distance from a failure node Np are preferentially selected as a candidate over a plurality of nodes positioned in a region with a longer distance from the failure node Np. A distance L represents the total sum of distances (the number of hops) from a failure node Np to a plurality of nodes inside a candidate region and is calculated as follows. The third priority is lower in level than the second priority. A specific example of the third priority will be described later.

Distance $L=\Sigma|Np-Ni|(i=1, 2, \ldots k)$ $|Np-Ni|$ represents the number of hops from a failure node Np to a node Ni inside a candidate region.

Fifth, in each of a rectangular region including a group of adjacent nodes and a region including a group of dispersing nodes, the dump management server selects dump-processing target nodes with a fourth priority according to which a plurality of nodes that need a shorter time to transfer a dump file from a failure node Np to the plurality of nodes are preferentially selected as a candidate over a plurality of nodes that need a longer time to transfer a dump file from the failure node Np to the plurality of nodes. The fourth priority is lower in level than at least the second priority. The fourth priority may be lower in level than the third priority. A specific example of the fourth priority will be described later. Note that a transfer time is calculated according to the following formula.

Transfer time $Tm=T1m/k$ $T1m$ represents a time needed to transfer all dump files to a single free node, and k represents the number of nodes of dump-processing target nodes. Since there is a likelihood that a transfer time increases with the capacities of dump files rather than transfer times between nodes, $T1m$ is divided by the number k of nodes to calculate the transfer time Tm. Accordingly, the transfer time Tm is shortened as the number of candidate nodes k of increases.

When dump-processing target nodes are searched with the above priorities indicated above, it becomes possible for the dump management server to detect a plurality of nodes suitable to a certain extent in a short time rather than strictly detecting a plurality of optimal nodes.

The flowchart of FIG. 8 is based on the above priorities. That is, the dump management server detects whether a group of adjacent free nodes meeting the conditions C1, C2, and C3 exists in any of the four regions obtained by dividing the reference range Zn near the failure node Np into four (S21). When a group of adjacent free nodes is detected (YES in S21) and the number of a group of detected adjacent free nodes is one (YES in S22), the dump management server selects the group of free nodes as dump-processing target nodes.

On the other hand, when the number of groups of adjacent free nodes is not one but plural (NO in S22) and a rectangular region having a minimum area S and including a group of adjacent free nodes exists (YES in S23), the dump management server selects the group of adjacent free nodes as dump-processing target nodes.

When a plurality of groups of adjacent free nodes whose rectangular region has a minimum area S exist (NO in S23) and a group of adjacent free nodes having a minimum distance L from the failure node Np to the group of adjacent free nodes exists (YES in S24), the dump management server selects the group of adjacent free nodes as dump-processing target nodes.

On the other hand, when a plurality of groups of adjacent free nodes whose distance L is a minimum distance L and are the same exist (NO in S24) and a group of adjacent free nodes having a minimum transfer time Tm exists (YES in S25), the dump management server selects the group of adjacent free nodes as dump-processing target nodes. Then, when a plurality of groups of adjacent free nodes whose transferring time Tm is a minimum transfer time Tm and are the same exist (NO in S25), the dump management server selects any of the rectangular regions.

When a group of adjacent free nodes meeting the conditions C1, C2, and C3 is not detected in any of the four divided regions (NO in S21), the dump management server detects whether the region of a group of dispersing free nodes meeting the conditions C1, C2, and C3 exists in any of the four regions (S26). When any region can be detected (YES in S26), the dump management server determines by turns whether the number of groups of dispersing free nodes is not one but plural (S27), determines whether the region of a group of dispersing free nodes having a minimum area S exists (S28), determines whether the region of a group of dispersing free nodes having a minimum distance L exists (S29), and determines whether the region of a group of dispersing free nodes having a minimum transfer time Tm exists (S30). When YES is determined in any of the steps, the dump management server selects the group of dispersing free nodes as dump-processing target nodes in the same way as the processing of steps S22 to S25.

Then, when any group of free nodes meeting the conditions C1, C2, and C3 is not detected in the four regions (NO in S21 and NO in S26), the dump management server selects a group of free nodes meeting the conditions C1, C2, and C3 in the reference region Zn (S31).

FIGS. 10, 11, 12, and 13 are diagrams illustrating examples of selecting dump-processing target nodes with the respective priorities. In an example (1) of FIG. 10 in which one group of adjacent nodes exists, only one region a is detected inside the X+Y+ region. In this case, YES is determined in step S22 of FIG. 8. In an example (2) of FIG. 10 in which a plurality of groups of adjacent nodes having different areas exist, a region a whose area S is 8 (=4×2) and a region b whose area S is 12 (=4×3) are detected. In this case, the region a is selected as the rectangular region of a group of adjacent nodes having a minimum area in step S23 of FIG. 8.

In an example (3) of FIG. 11 in which a plurality of groups of adjacent nodes having the same area and different distances exist, regions a and b are detected. The area S of each of the regions a and b is 4 (=2×2). The distance L of the region a is 2, and the distance L of the region b is 5. Therefore, the region a having the minimum distance is selected in step S24 of FIG. 8.

In an example (4) of FIG. 11 in which a plurality of groups of adjacent nodes having the same area, the same distance, and different transfer speeds exist, regions a and b are detected. The area S of each of the regions a and b is 4 (=2×2), and the distance L of each of the regions a and b is 2. For the number of nodes according to which a transfer time is determined, the regions a and b have four nodes and three nodes, respectively. Therefore, the region a having the minimum transfer time is selected in step S25 of FIG. 8.

In an example (1) of FIG. 12 in which one region of a group of dispersing nodes exists, only one region a is detected inside the X+Y+ region. In this case, YES is determined in step S27 of FIG. 8.

In an example (2) of FIG. 12 in which a plurality of regions of groups of dispersing nodes having different areas exist, a region a whose area S is 4 (=2×2) and a region b whose area S is 6 (=2×3) are detected. In this case, the region a is selected as the region of a group of dispersing nodes having a minimum area in step S28 of FIG. 8.

In an example (3) of FIG. 13 in which a plurality of regions of groups of dispersing nodes having the same area and different distances exist, regions a and b are detected. The area S of each of the regions a and b is 4 (=2×2), the distance L of the region a is 4, and the distance L of the region b is 5. Therefore, the region a having the minimum distance is selected in step S29 of FIG. 8.

In an example (4) of FIG. 13 in which a plurality of regions of the groups of dispersing nodes having the same area, the same distance, and different transfer times, regions a and b are detected. The area S of each of the regions a and b is 4 (=2×2), the distance L of each of the regions a and b is 2. For the number of nodes according to which a transfer time is determined, the regions a and b have three nodes and two nodes, respectively. Therefore, the region a having the minimum transfer time is selected in step S25 of FIG. 8.

(File System Using Memories of Dump-Processing Target Nodes as Storage Media)

In the embodiment, a dump file inside the memory of a failure node is written in the memories of dump-processing target nodes selected corresponding to the failure node, whereby the dump processing is completed in a short time. Then, the dump management server accesses dump files inside the memories of the dump-processing target nodes to be capable of performing the analysis and failure analysis of the dump files.

In order to be capable of transferring dump files and accessing the dump files, the embodiment uses, for example, a file system that employs a virtual disk using the memories of dump-processing target nodes as storage media. The file system will be called a memory file system in the embodiment.

As a file system that uses the memories of a plurality of nodes as storage media, an in-memory data grid and an in-memory data storage are, for example, known in a database.

In the embodiment, respective nodes run a memory file system construction program that constructs a memory file system and a memory file system mounting program that mounts the memory file system. In addition, the dump management server runs the memory file system mounting program.

In general, a file system represents one function of an OS. The file system causes the disk-device driver of an OS to access the files of a disk device such as a HDD defined by, for example, a disk name, a sector size, and the number of sectors, or the like. The driver accesses files based on a file allocation table (FAT) storing sector positions at which the files are stored.

Conversely, in a memory file system, a virtual disk drive is defined, and the access destination information of the virtual disk drive is converted into information on accessing the memories of a plurality of nodes (IP addresses of the nodes, addresses inside the memories, or the like) to access files, for example. Accordingly, the memory file system construction program generates the structure (data) of the memory file system that defines the disk name of a virtual disk, a sector size, the number of sectors, a directory having a FAT, or the like based on the structures and the capacities of memories inside dump-processing target nodes. In addition, the memory file system mounting program allows the conversion of access information according to mounting nodes or a server.

The above description illustrates only an example of the construction and the mounting method of one memory file system and a mounting method. However, construction methods and mounting methods other than the above may be used.

FIG. 14 is a diagram illustrating the functions of the dump management server. The dump management server 400 has a dump-processing target node determination unit 401, a memory file system control unit 402, and a memory file system mounting unit 403. A processor of the dump management server 400 executes or runs a dump target node determination program, a memory file system control program, and a memory file system mounting program loaded from the sub-storage unit 14 into the main memory 12 to realize the dump-processing target node determination unit 401, the memory file system control unit 402, and the memory file system mounting unit 403 described above, respectively.

The dump-processing target node determination unit 401 acquires node information from the system management server 200 and job information from the job management server 300 and selects dump-processing target nodes according to the flowcharts illustrated in FIGS. 4 and 8.

In addition, the dump-processing target node determination unit 401 generates address information tables 410 and 411 needed to construct and refer to the memory file system. The address information table includes the address information table 410 for the transfer-source memory file system of dump files and the address information table 411 for the transfer-destination memory file system of the dump files.

As described above, the memory file system converts the access information (addresses) of a virtual disk device into information (IP addresses and addresses of memories) for accessing the memories of dump-processing target nodes. The address information tables 410 and 411 described above are tables needed to convert the access information.

FIG. 15 is a diagram illustrating an example of an address information table. The address information table includes information (host names and IP addresses) for specifying each of a plurality of nodes constituting dump-processing target nodes, the addresses (the start addresses addr-s to the end addresses addr-e) of the free spaces of memories inside the nodes, the addresses (the start addresses to the end addresses) of the virtual disks of the memory file systems, and information (path names or the like) (not illustrated) for mounting the memory file systems. In the figure, addr-diff represents the differences between start addresses addr-s and end addresses addr-e.

The dump-processing target node determination unit 401 generates the transfer-source address information table 410 and the transfer-destination address information table 411. However, when a dump file inside the memory of a failure node is transferred to the memories of dump-processing target nodes, the memory file system of the dump file transfer source is not constructed. Accordingly, the transfer-source address information table 410 has vacant (φ) address information. On the other hand, the memory file systems of the dump file transfer destinations are constructed. Accordingly, the transfer-source address information table 411 includes the information described above.

Referring back to FIG. 14, the memory file system control unit 402 has the following functions.

(1) The function of distributing an address information table to a dump-processing target node Nd.

(2) The function of instructing the memory file system construction program of a dump-processing target node Nd to construct a transfer-destination memory file system and cancel the construction based on an address information table.

(3) The function of instructing the memory file system mounting program of a failure node Np or a dump-processing target node Nd to mount/dismount a constructed memory file system.

(4) The function of instructing a failure node Np to execute a dump command to write the image file of the memory of the failure node in a transfer-destination memory file system as a dump file.

(5) The function of instructing the transfer of a dump file from a transfer-source memory file system to a transfer-destination memory file system with respect to a new dump-processing target node.

The control of transferring a dump file from a failure node to dump-processing target nodes and the control of transferring dump files from current (old) dump-processing target nodes to new dump-processing target nodes by the memory file system control unit 402 will be described later.

The memory file system mounting unit 403 of the dump management server 400 mounts a memory file system, to which a dump file has been transferred, to be accessible to the dump file. The mounting processing represents, for example, processing to install the virtual driver of the virtual disk device of the memory file system. Thus, the dump management server 400 is made accessible to a memory file system by a virtual VHDD in addition to a file system by a physical HDD. That is, in response to a request for accessing a memory file system from a user, the dump management server 400 converts the address information of a virtual disk device representing an access destination into the address information of a memory inside a dump-processing target node and accesses the memory inside the dump-processing target node. In the way described above, the dump management server 400 accesses a dump file.

FIG. 16 is a flowchart illustrating a processing example of the dump processing instruction S10 by the dump management server. The dump processing represents a processing example of transferring a dump file from a failure node to dump-processing target nodes. FIG. 16 illustrates, in addition to the processing of the dump processing instruction S10 by the dump management server, the processing of the dump processing S11 by a failure node corresponding to the processing of the dump processing instruction S10. The processing S114, S115, and S116 of the dump processing S11 by the failure node corresponds to the processing S114, S115, and S116 of FIG. 7.

Figure 17:
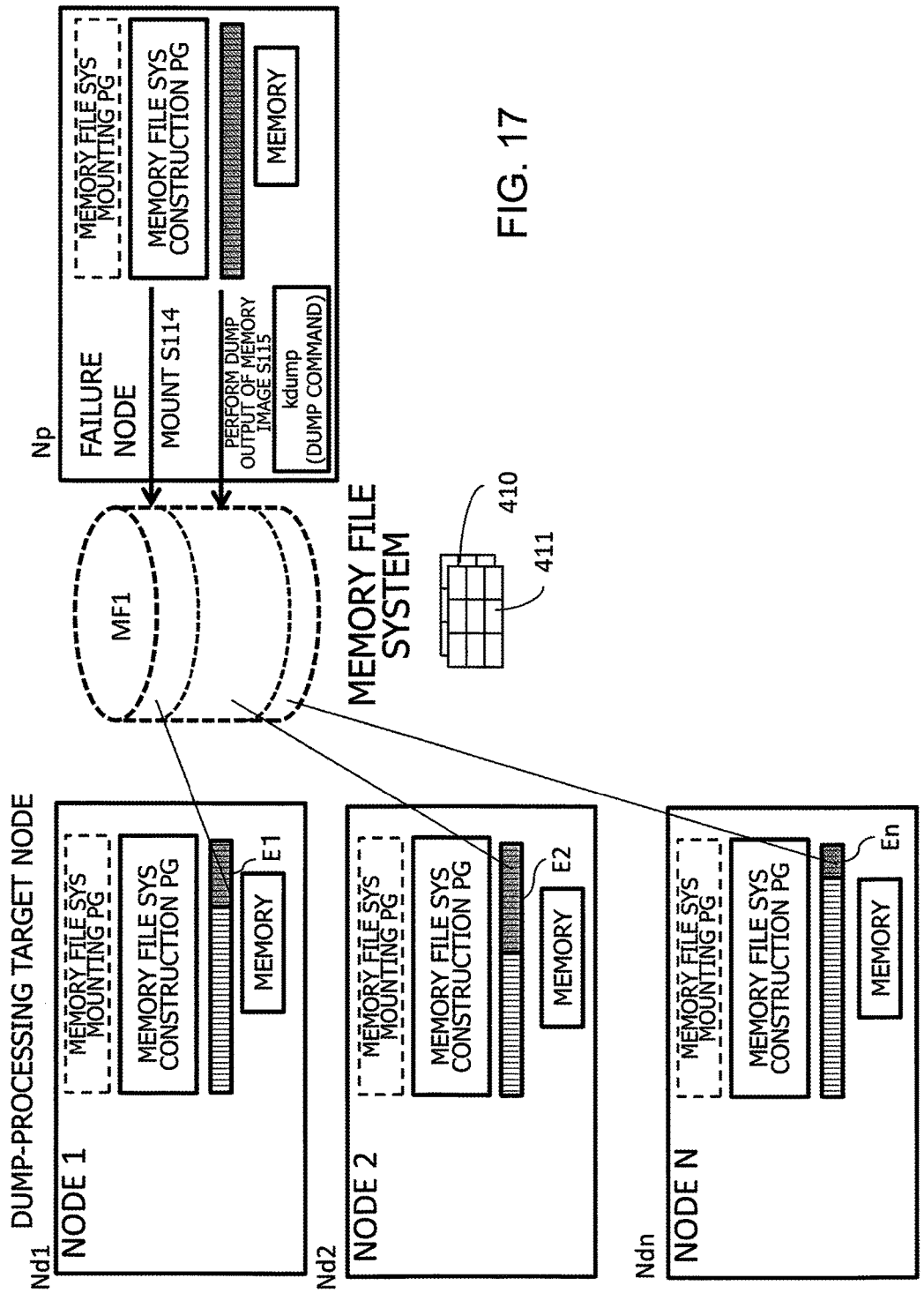
FIG. 17 is a diagram illustrating the processing of FIG. 16.

FIG. 17 is a diagram illustrating the processing of FIG. 16. FIG. 17 illustrates a failure node Np, a plurality of nodes Nd1, Nd2, . . . , Ndn representing dump-processing target nodes, and a memory file system MF1.

As illustrated in FIG. 14, the memory file system control unit 402 of the dump management server 400 sends the transfer-source/transfer-destination address information tables 410 and 411 to the dump-processing target nodes Nd1 to Ndn (S101). Examples of the tables are illustrated in FIG. 15.

Next, the memory file system control unit 402 instructs the dump-processing target nodes Nd1 to Ndn to construct the memory file system MF1 (S102). In response to the instruction, the memory file system construction programs (PG) of the dump-processing target nodes Nd1 to Ndn generate, for example, a structure for defining the memory file system MF1. Thus, the memory file system MF1 that uses the free spaces E1 to En of memories inside the dump-processing target nodes Nd1 to Ndn as storage media is constructed.

Then, the memory file system control unit 402 instructs the failure node Np to mount the memory file system MF1 (S103). In response to the instruction, the memory file system mounting program (PG) of the failure node Np mounts the memory file system MF1 (S114). Specifically, for example, the failure node Np constructs the virtual disk device of the memory file system MF1 and installs the driver of the virtual disk device. Thus, the dump-processing second kernel of the failure node Np is allowed to perform the writing, reading, or the like of data with respect to the memory file system MF1.

Next, the memory file system control unit 402 instructs the failure node Nd to write a dump file inside the memory of the failure node in the memory file system MF1 (S104). In response to the instruction, the second kernel of the failure node Nd writes the dump file inside the memory in the memory file system MF1 (S115). The processing to write the dump file in the memory file system MF1 is performed by address conversion based on the transfer-destination address information table and processing to write the dump file in the memories of the dump-processing target nodes. Thus, the dump file inside the memory of the failure node is transferred to the free spaces of the memories of the dump-processing target nodes.

Finally, the memory file system mounting unit 403 of the dump management server mounts the memory file system MF1 (S105). Thus, the dump management server accesses the virtual disk of the mounted memory file system to read the dump file. Accordingly, a user is allowed to access the dump management server 400 to read and analyze the dump file.

As described above, when a node fails, the second kernel of the failure node Nd transfers a dump file inside its memory to the memories of a group of nodes of dump-processing target nodes. When a plurality of nodes fail, respective dump files are transferred to the memories of dump-processing target nodes selected corresponding to the respective failure nodes. Accordingly, it takes a short time to transfer dump files in the embodiment compared with a case in which the dump file is transferred to a single file server or a single node.

Figure 18:
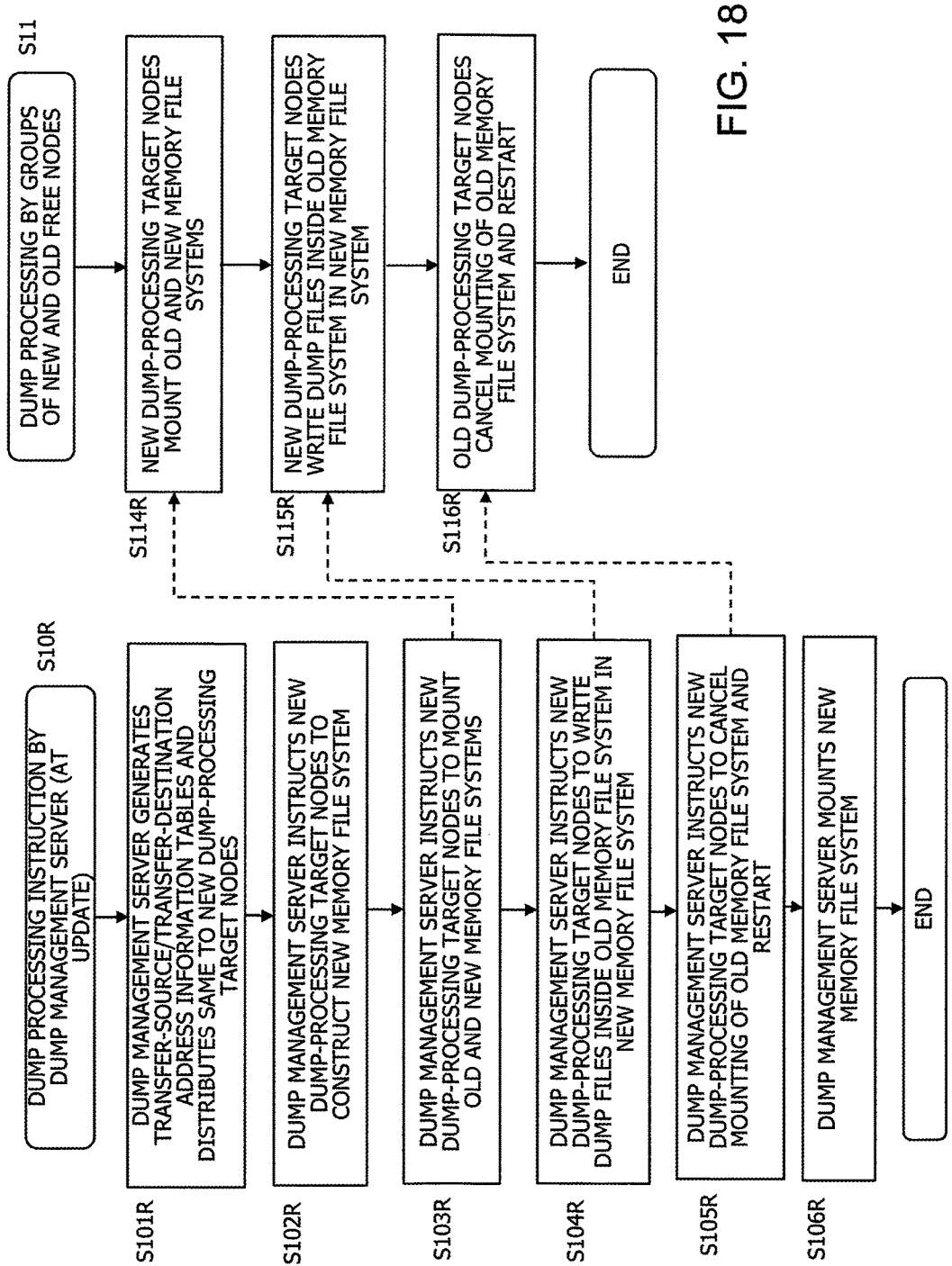
FIG. 18 is a flowchart illustrating a processing example of the dump processing instruction S10R.

FIG. 18 is a flowchart illustrating a processing example of the dump processing instruction S10R. The dump processing represents a processing example of transferring dump files from the memories of current (old) dump-processing target nodes to the memories of newly-selected new dump-processing target nodes. Prior to the dump processing instruction S10R of FIG. 18, the dump-processing target node determination unit 401 selects new dump-processing target nodes and generates a new transfer-destination address information table 411 as illustrated in FIG. 14. Further, an old transfer-destination address information table 411 is used as it is as a new transfer-source address information table 410.

Figure 19:
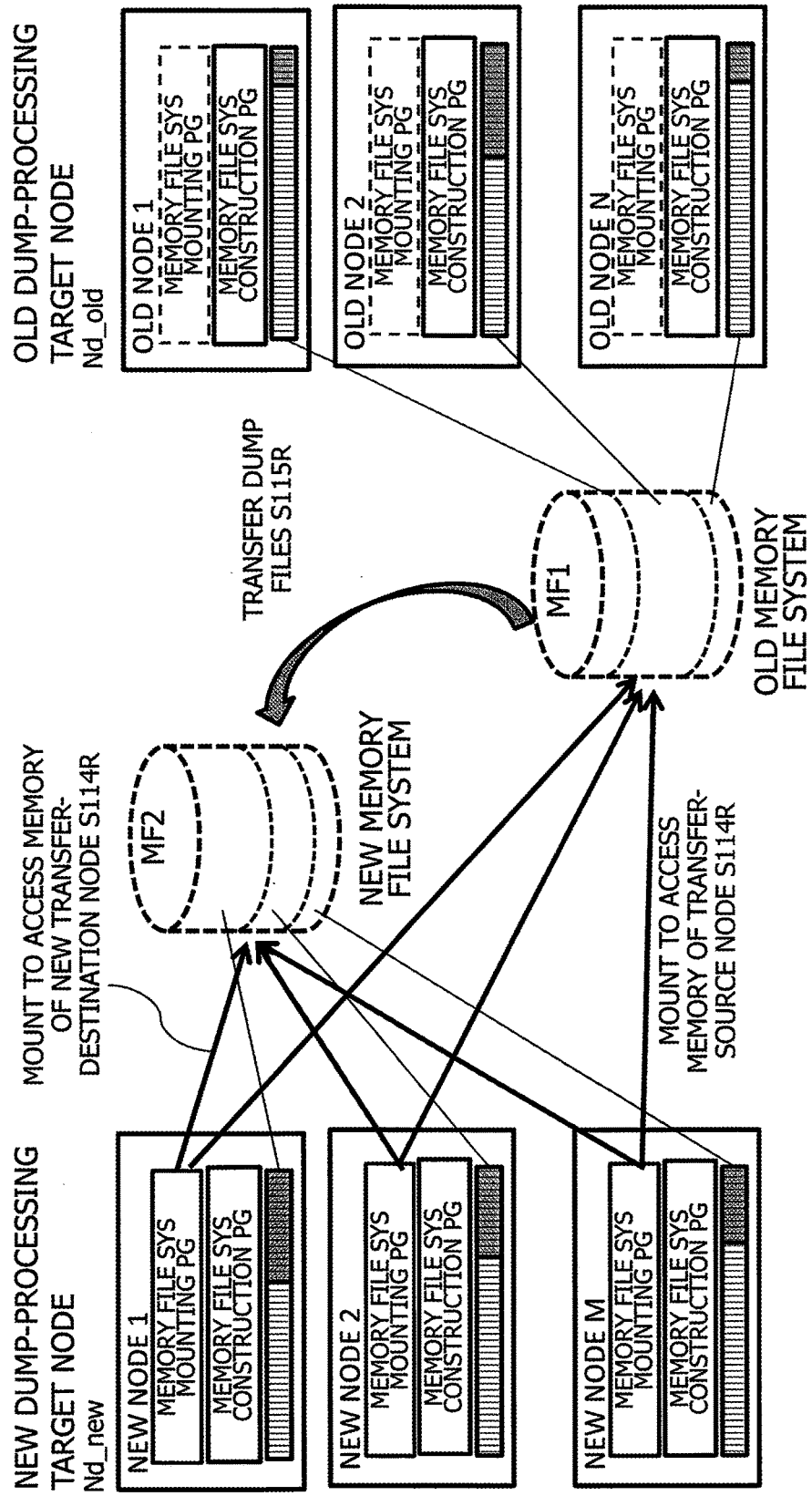
FIG. 19 is a diagram illustrating both old dump-processing target nodes and an old memory file system and new dump-processing target nodes and a new memory file system in the dump processing of FIG. 18.
Figure 20:
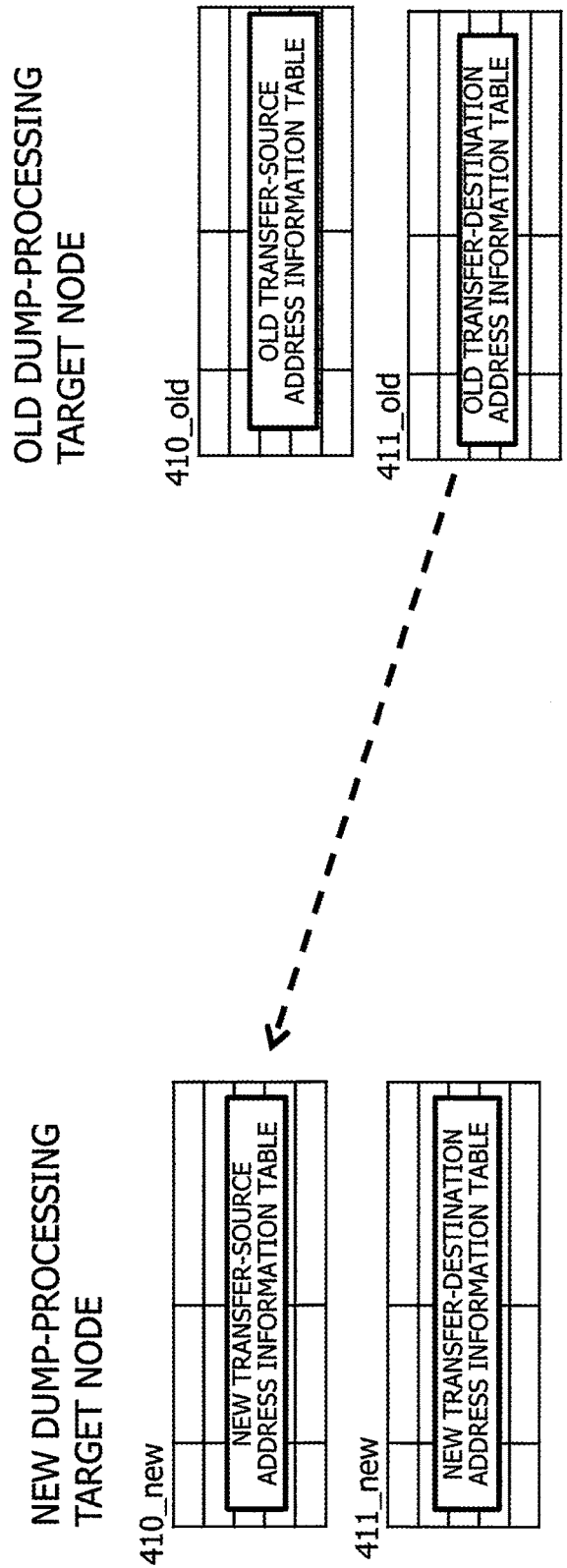
FIG. 20 is a diagram illustrating old transfer-source/ transfer-destination address information tables 410_old and 411_old and new transfer-source/transfer-destination address information tables 410_new and 411_new.

FIG. 19 is a diagram illustrating both current (old) dump-processing target nodes and an old memory file system and new dump-processing target nodes and a new memory file system in the dump processing of FIG. 18. FIG. 20 is a diagram illustrating old transfer-source/transfer-destination address information tables 410_old and 411_old and new transfer-source/transfer-destination address information tables 410_new and 411_new.

A description will be given of processing relating to the dump processing instruction S10R with reference to FIG. 18. First, the memory file system control unit 402 of the dump management server 400 sends a new transfer-source address information table 410 corresponding to old dump-processing target nodes and a new transfer-destination address information table 411 corresponding to newly-selected dump-processing target nodes to the new dump-processing target nodes (S101R). As illustrated in FIG. 20, an old transfer-destination address information table 411_old is used as it is as a new transfer-source address information table 410_new.

Next, the memory file system control unit 402 instructs the new dump-processing target nodes to construct a new memory file system MF2 (S102R). Then, the memory file system control unit 402 instruct the new dump-processing target nodes Nd_new to mount an old memory file system MF1 and the new memory file system MF2 (S103R). In response to the instruction, the new dump-processing target nodes Nd_new mounts both the memory file systems MF1 and MF2 (S114R).

As illustrated in FIG. 19, the old memory file system MF1 is a file system that uses the memories of the old dump-processing target nodes Nd_old as storage media and has stored dump files therein. On the other hand, the new memory file system MF2 is a file system that uses the memories of the new dump-processing target nodes Nd_new as storage media and has not stored dump files therein.

Then, the memory file system control unit 402 instructs the new dump-processing target nodes Nd_new to write dump files inside the old memory file system MF1 in the new memory file system MF2 (s104R). In response to the instruction, the new dump-processing target nodes Nd_new read the dump files inside the old memory file system MF1 and write the same in the new memory file system MF2 (S115R). Thus, the dump files are transferred from the memories of the old dump-processing target nodes to the memories of the new dump-processing target nodes.

Next, the memory file system control unit 402 instructs the old dump-processing target nodes Nd_old to cancel the mounting of the old memory file system MF1 and restart (S105R). In response to the instruction, the old dump-processing target nodes Nd_old cancel the mounting of the old memory file system MF1 and restart (S116R). Thus, the old dump-processing target nodes are newly added to job allocation targets.

Finally, the memory file system mounting unit 403 of the dump management server 400 mounts the new memory file system MF2 (S106R). Thus, the dump management server is allowed to read dump files.

As described above, in order to the transfer dump files from old dump-processing target nodes to new dump-processing target nodes, the newly-selected new dump-processing target nodes perform the processing to read the dump files from the old memory file system MF1 and the processing to write the dump files in the new memory file system MF2. Accordingly, dump files are not intensively transferred to a single file server, the dump management server, or the like.

When a second time Tp elapses since the occurrence of a failure, the dump management server reads dump files inside a mounted memory file system and writes the same in the file system of an actual HDD device connected to the dump management server. The transfer processing of the dump files corresponds to step S115R of FIG. 18. Since the dump management server has mounted the memory file system for accessing the dump files, the dump management server reads the dump files from the memory file system and writes the same in the file system of the mounted actual HDD device. In this way, the dump management server is allowed to transfer dump files to the sub-storage unit of the dump management server.

Then, the dump management server instructs the dump-processing target nodes to dismount the memory file system. In response to the instruction, the dump-processing target nodes dismount the memory file system and restarts. The processing corresponds to step S116R of FIG. 18.

As described above, since a failure node transfers a dump file inside its memory to the memories of a plurality of dump-processing target nodes including a plurality of free nodes according to the embodiment, the dump processing may be completed in a short time. In addition, since the dump management server is accessible to dump files inside the memories of dump-processing target nodes, the access, analysis, and failure analysis of the dump files may be efficiently performed.

According to the embodiment, a group of adjacent nodes as close as possible to each other positioned near a failure node is selected with priority as dump-processing target nodes to which a dump file is to be transferred. Thus, an impact on processing to allocate jobs to free nodes performed independently of the dump processing may be reduced to a greater extent. In addition, since dump-processing target nodes are selected only from among nodes near a failure node, the selection processing is completed in a short time.

According to the embodiment, dump-processing target nodes retain a dump file only within a first time, and the dump file is transferred to new dump-processing target nodes after the elapse of the first time. Therefore, an impact on processing to allocate jobs to free nodes may be reduced.

Moreover, according to the embodiment, dump files inside dump-processing target nodes are transferred to the sub-storage unit of the dump management server when a second time elapses since the occurrence of a failure. Therefore, an impact on processing to allocate jobs to free nodes may be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A dump management apparatus comprising:
a memory; and
a processor that executes a process including:
selecting, in response to receiving a notification of an occurrence of a failure from a failure node of a parallel computer that has a plurality of nodes, in which a plurality of jobs are assigned to a part of nodes in the plurality of nodes and the part of nodes, to which the plurality of jobs are assigned, execute the plurality of jobs respectively, a plurality of nodes that are not scheduled to execute a job within at least a first time needed to perform dump processing of a memory of the failure node and have a memory capacity needed to perform the dump processing as dump-processing target nodes from among a plurality of nodes within a reference range near the failure node;
and
causing the failure node to transfer a dump file inside the memory of the failure node to memories of the dump-processing target nodes,
the selecting the plurality of nodes as the dump-processing target nodes includes selecting the dump-processing target nodes, with a first priority according to which a plurality of adjacent nodes are preferentially selected as a candidate over a plurality of dispersing nodes, from among candidates for the dump-processing target nodes.

2. The dump management apparatus according to claim 1, wherein the process includes selecting the dump-processing target nodes with a second priority according to which a plurality of nodes positioned in a narrower region are preferentially selected as a candidate over a plurality of nodes positioned in a wider region from among the candidates for the dump-processing target nodes, the second priority representing a next-highest priority after the first priority.

3. The dump management apparatus according to claim 2, wherein the process includes selecting the dump-processing target nodes with a third priority according to which a plurality of nodes positioned in a region with a shorter distance from the failure node are preferentially selected as a candidate over a plurality of nodes positioned in a region with a longer distance from the failure node from among the candidates for the dump-processing target nodes, the third priority representing a next-highest priority after the second priority.

4. The dump management apparatus according to claim 3, wherein the process includes selecting the dump-processing target nodes with a fourth priority according to which a plurality of nodes that need a shorter time to transfer dump data from the failure node to the plurality of nodes are preferentially selected as a candidate over a plurality of nodes that need a longer time to transfer the dump data from the failure node to the plurality of nodes from among the candidates for the dump-processing target nodes, the fourth priority representing a next-highest priority after the third priority.

5. The dump management apparatus according to claim 1, wherein the process includes newly selecting new dump-processing target nodes every time the first time or longer elapses after the transfer of the dump file by the failure node, and causing dump files inside memories of the old dump-processing target nodes, which are selected before the new dump-processing target nodes, to be transferred to memories of the new dump-processing target nodes.

6. The dump management apparatus according to claim 1, further comprising a sub-storage unit, wherein causing dump files inside memories of the dump-processing target nodes to be transferred to the sub-storage unit after an elapse of a second time longer than the first time since the failure of the failure node.

7. The dump management apparatus according to claim 5, further comprising a sub-storage unit, wherein the process includes causing dump files inside memories of the dump-processing target nodes to be transferred to the sub-storage unit after an elapse of a second time longer than the first time since the failure of the failure node.

8. The dump management apparatus according to claim 1, wherein the process includes mounting a dump-processing file system using memories of the dump-processing target nodes as storage media.

9. A non-transitory computer storage medium that stores therein a computer readable program for causing a computer to execute a dump management process comprising:

selecting, in response to receiving a notification of an occurrence of a failure from a failure node of a parallel computer that has a plurality of nodes, in which a plurality of jobs are assigned to a part of nodes in the plurality of nodes and the part of nodes, to which the plurality of jobs are assigned, execute the plurality of jobs respectively, a plurality of nodes that are not scheduled to execute a job within at least a first time needed to perform dump processing of a memory of the failure node and have a memory capacity needed to perform the dump processing as dump-processing target nodes from among a plurality of nodes within a reference range near the failure node; and causing the failure node to transfer a dump file inside the memory of the failure node to memories of the dump-processing target nodes, the selecting the plurality of nodes as the dump-processing target nodes includes selecting the dump-processing target nodes, with a first priority according to which a plurality of adjacent nodes are preferentially selected as a candidate over a plurality of dispersing nodes, from among candidates for the dump-processing target nodes.

10. The non-transitory computer storage medium according to claim 9, wherein the dump management process includes newly selecting new dump-processing target nodes every time the first time or longer elapses after the transfer of the dump file by the failure node, and causing dump files inside memories of the old dump-processing target nodes, which are selected before the new dump-processing target nodes, to be transferred to memories of the new dump-processing target nodes.

11. The non-transitory computer storage medium according to claim 10, wherein the dump management process includes causing dump files inside memories of the dump-processing target nodes to be transferred to a sub-storage unit after an elapse of a second time longer than the first time since the failure of the failure node.

12. A method of dump management, the method comprising:

selecting, in response to receiving a notification of an occurrence of a failure from a failure node of a parallel computer that has a plurality of nodes, in which a plurality of jobs are assigned to a part of nodes in the plurality of nodes and the part of nodes, to which the plurality of jobs are assigned, execute the plurality of jobs respectively, a plurality of nodes that are not scheduled to execute a job within at least a first time needed to perform dump processing of a memory of the failure node and have a memory capacity needed to perform the dump processing as dump-processing target nodes from among a plurality of nodes within a reference range near the failure node; and causing the failure node to transfer a dump file inside the memory of the failure node to memories of the dump-processing target nodes, the selecting the plurality of nodes as the dump-processing target nodes includes selecting the dump-processing target nodes, with a first priority according to which a plurality of adjacent nodes are preferentially selected as a candidate over a plurality of dispersing nodes, from among candidates for the dump-processing target nodes.

* * * * *